(12) United States Patent
Suminaka et al.

(10) Patent No.: US 11,794,687 B2
(45) Date of Patent: Oct. 24, 2023

(54) SEAT BELT ANCHOR DEVICE

(71) Applicant: ASHIMORI INDUSTRY CO., LTD., Settsu (JP)

(72) Inventors: Satoshi Suminaka, Settsu (JP); Eri Fujiwara, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 0 days.

(21) Appl. No.: 17/450,198

(22) Filed: Oct. 7, 2021

(65) Prior Publication Data

US 2022/0024406 A1    Jan. 27, 2022

Related U.S. Application Data

(62) Division of application No. 16/416,859, filed on May 20, 2019, now Pat. No. 11,142,162.

(30) Foreign Application Priority Data

May 21, 2018  (JP) .................................. 2018-096967
May 21, 2018  (JP) .................................. 2018-096968

(51) Int. Cl.
*B60R 22/24*    (2006.01)
(52) U.S. Cl.
CPC .................................. *B60R 22/24* (2013.01)
(58) Field of Classification Search
CPC .. B60R 22/18; B60R 22/24; B60R 2022/1818
See application file for complete search history.

(56) References Cited

U.S. PATENT DOCUMENTS

| 3,437,349 A | 4/1969 | Feles et al. |
| 5,215,332 A | 6/1993 | De Sloovere |
| 5,427,412 A | 6/1995 | Staniszewski |
| 5,464,252 A | 11/1995 | Kanazawa et al. |

(Continued)

FOREIGN PATENT DOCUMENTS

| JP | S5013527 B1 | 5/1975 |
| JP | H6239199 A | 8/1994 |
| WO | 0142063 A1 | 6/2001 |

OTHER PUBLICATIONS

Japan Patent Office, Notice of Reasons for Revocation Issued in Application No. 2021098181, dated Sep. 12, 2023, 31 pages.

*Primary Examiner* — James A English
(74) *Attorney, Agent, or Firm* — Alleman Hall Creasman & Tuttle LLP

(57) ABSTRACT

A seat belt anchor device according to one aspect includes: an anchor plate including a loop attached portion for a seat belt webbing, and having an opening including an enlarged region into which a head of a stud is allowed to be inserted and a lock region in which the head of the stud is not allowed to enter from the enlarged region but a shank of the stud is allowed to enter; a protector attached to the anchor plate and including a bridge portion disposed over the enlarged region on a side opposite to a vehicle body with respect to the enlarged region so that the loop is held between the protector and the loop attached portion; and a stopper attached to the anchor plate and configured to engage with the head of the stud when the shank of the stud enters the lock region from the enlarged region.

19 Claims, 20 Drawing Sheets

(56) References Cited

U.S. PATENT DOCUMENTS

| | | | |
|---|---|---|---|
| 7,413,371 B2 * | 8/2008 | Arnold | B60R 22/18 |
| | | | 403/329 |
| 7,540,536 B2 * | 6/2009 | Hall | B60R 22/24 |
| | | | 280/801.1 |
| 9,814,282 B2 * | 11/2017 | Merrick | A44B 11/2523 |
| 2021/0339701 A1 * | 11/2021 | Watanabe | B60R 22/18 |

* cited by examiner

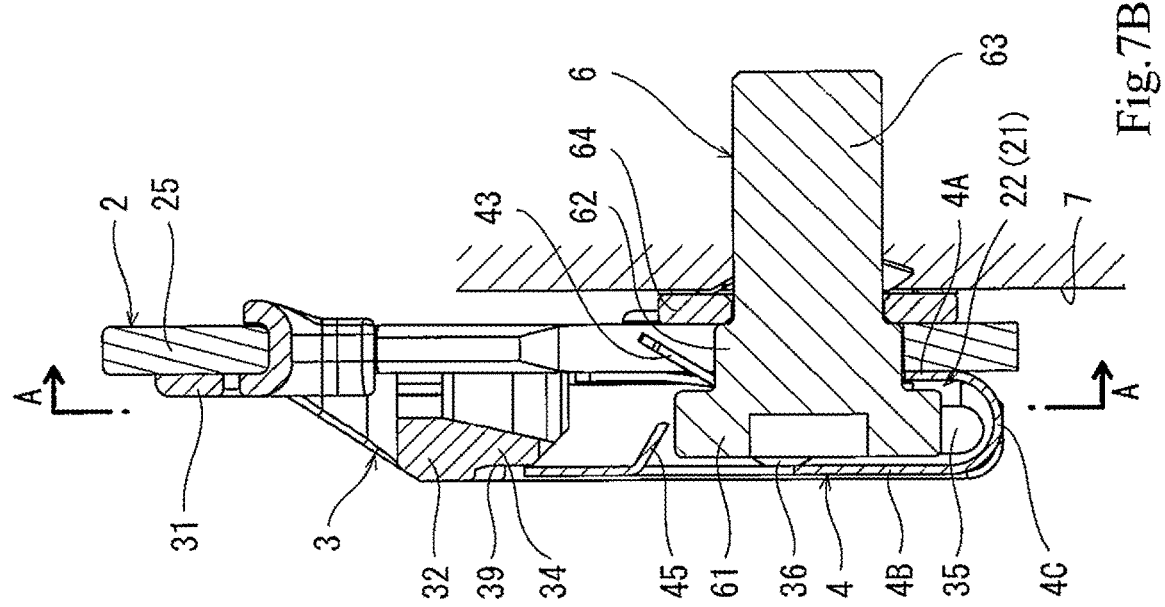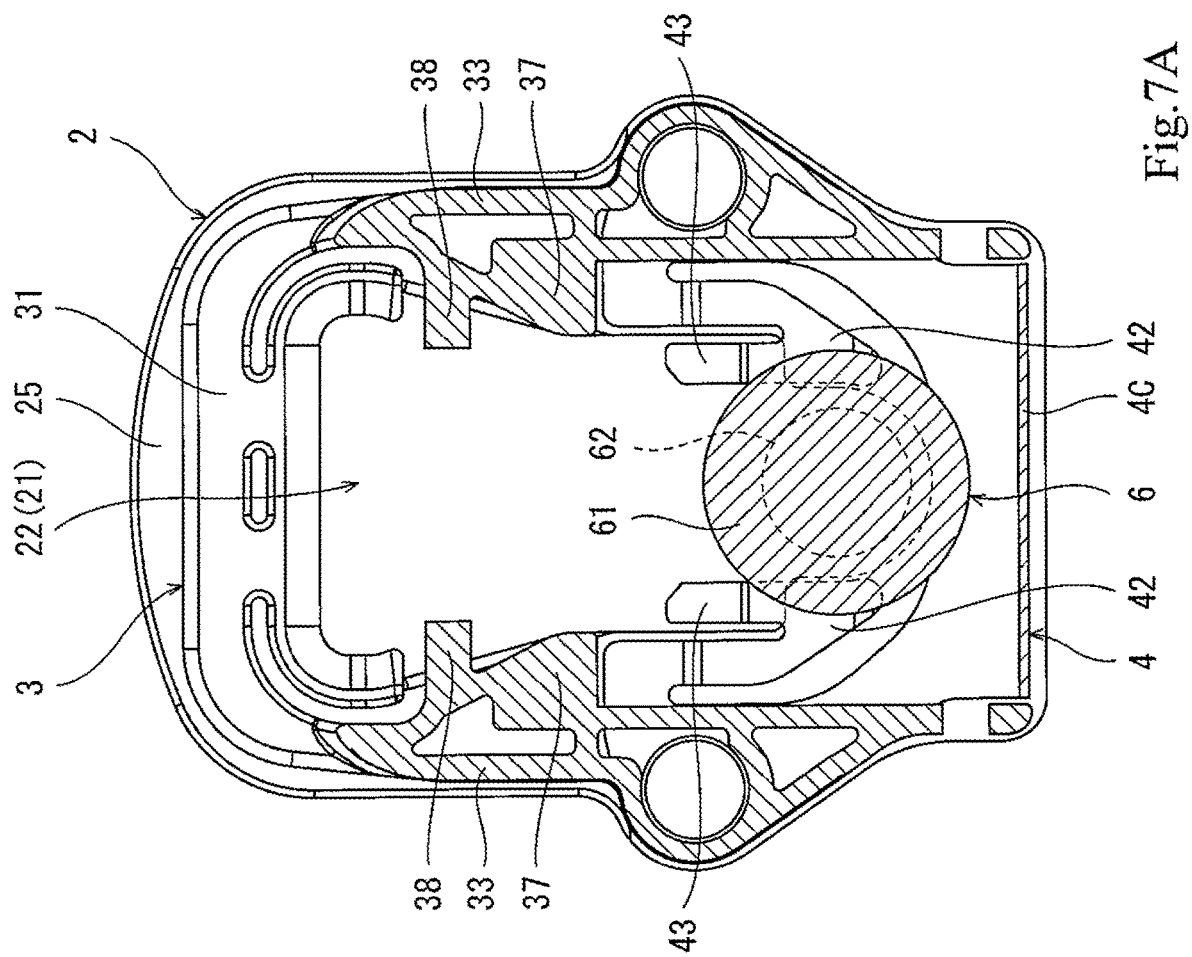

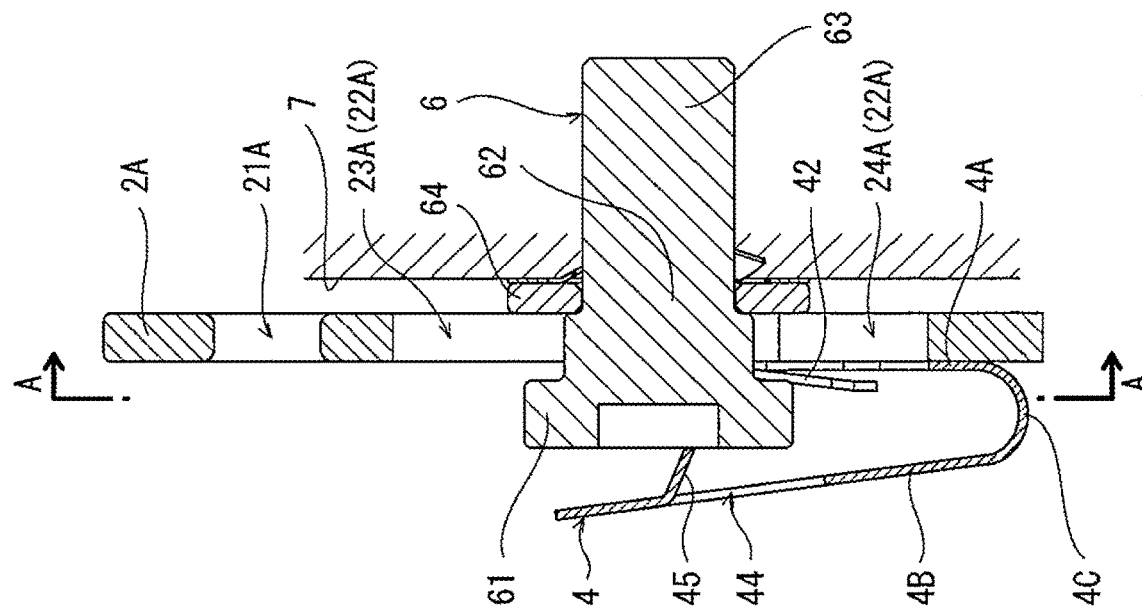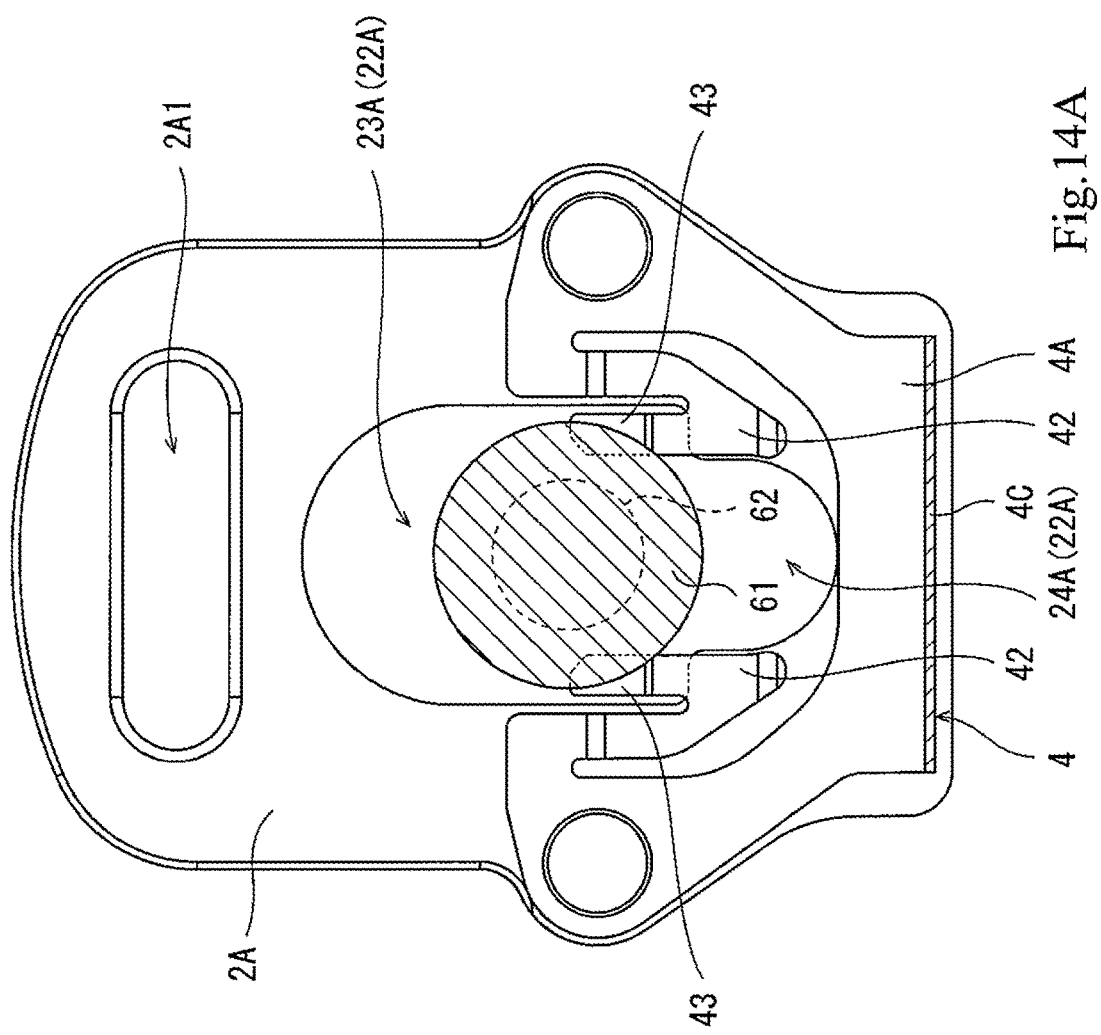

SEAT BELT ANCHOR DEVICE

CROSS-REFERENCE TO RELATED APPLICATION

The present application is a divisional of U.S. patent application Ser. No. 16/416,859, filed May 20, 2019, and entitled SEAT BELT ANCHOR DEVICE, which in turn claims priority to Japanese Patent Applications No. 2018-096967 and No. 2018-096968, filed on May 21, 2018, the entire disclosures of which are hereby incorporated herein by reference for all purposes.

BACKGROUND OF THE INVENTION

Field of the Invention

The present invention relates to a seat belt anchor device to be fixed to a stud provided to a vehicle body.

Description of Related Art

In a vehicle, an end portion of a seat belt is connected with a vehicle body through a seat belt anchor device in some cases. For example, Japanese Patent Laid-open No. 2005-206146 discloses a seat belt anchor device 110 as illustrated in FIG. 19.

Specifically, the vehicle body is provided with a stud 100 including a large-diameter head 101 and a small-diameter shank 102. The seat belt anchor device 110 is fixed to the stud 100 and includes an anchor plate 120 and a stopper 130 attached to the anchor plate 120.

The anchor plate 120 includes a loop attached portion 121 that fixes a loop (not illustrated) formed at one end of a seat belt webbing. In addition, the anchor plate 120 has an opening 122 extending from the loop attached portion 121 in a direction opposite to the seat belt webbing. The opening 122 includes, on the loop attached portion 121 side, an enlarged region 123 into which the head 101 of the stud 100 is allowed to be inserted, and includes, at a leading end, a lock region 124 in which the head 101 of the stud 100 is not allowed to enter from the enlarged region 123 but the shank 102 is allowed to enter.

When the anchor device 110 illustrated in FIG. 19 is fixed to the stud 100, first, the head 101 of the stud 100 is inserted into the enlarged region 123 of the opening 122 through the enlarged region 123. Then, when the anchor plate 120 is operated so that the stud 100 moves from the enlarged region 123 toward the lock region 124 and the shank 102 of the stud 100 enters the lock region 124 from the enlarged region 123, the stopper 130 engages with the head 101 of the stud 100 (more precisely, a recess formed at the head 101).

U.S. Pat. No. 7,540,536 discloses a seat belt anchor device 210 as illustrated in FIGS. 20 and 21. The seat belt anchor device 210 includes an anchor plate 220, and a stopper 230 as a plate spring. The stopper 230 is attached to the anchor plate 220 by a rivet 240.

The anchor plate 220 has a first opening 221 that fixes a loop (not illustrated) formed at one end of a seat belt webbing, and a second opening 222 having a key hole shape. The second opening 222 includes a circular enlarged region 223 into which a head 201 of a stud 200 is allowed to be inserted, and a lock region 224 extending from the enlarged region 223 in a direction opposite to the first opening 221. The lock region 224 is a slit region in which the head 101 of the stud 100 is not allowed to enter from the enlarged region 223 but the shank 102 is allowed to enter.

The stopper 230 extends in the extension direction of the lock region 224 to cover the second opening 222. The stopper 230 includes a lock piece 231 substantially at the center, and a pressing piece 232 at a lower end. The lock piece 231 allows the head 101 to pass through when the anchor plate 220 is moved in a direction from the second opening 222 toward the first opening 221 while the head 101 of the stud 100 is inserted into the enlarged region 223 of the second opening 222 through the enlarged region 223, and the lock piece 231 prevents the head 101 from returning to the enlarged region 223 when the shank 102 of the stud 100 enters the lock region 224 from the enlarged region 223 and is positioned at an end portion of the lock region 224. The pressing piece 232 presses the head 101 to the anchor plate 220 when the shank 102 is positioned at the end portion of the lock region 224. Accordingly, the anchor plate 220 is prevented from vibrating relative to the stud 100 and generating abnormal noise.

SUMMARY OF THE INVENTION

However, the anchor device 110 illustrated in FIG. 19 has the following problems. The loop of the seat belt webbing is formed by winding the seat belt webbing around the loop attached portion 121, and the perimeter of the loop is longer than the perimeter of the loop attached portion 121. In other words, the loop is movable relative to the loop attached portion 121. Thus, when the head 101 of the stud 100 is inserted into the enlarged region 123 of the opening 122, the loop needs to be pulled and pressed against an edge of the loop attached portion 121 on a side of the opening 122 so that the loop does not interfere with the head 101 of the stud 100. Accordingly, it is difficult to attach the anchor plate 120 to the stud 100.

In some seat belt anchor devices, an anchor plate has a first opening dedicated to a loop of a seat belt webbing, and a second opening having a key hole shape (shape in which a slit portion extends from a circular portion) and dedicated to a stud exists. However, in such an anchor device, the circular portion of the second opening is slightly larger than a head of the stud, and thus it is difficult to attach the anchor plate 120 to the stud 100.

Thus, it is a first object of the present invention to provide a seat belt anchor device with which an anchor plate can be easily attached to a stud.

In the anchor device 210 illustrated in FIGS. 20 and 21, when the anchor plate 220 is moved so that the shank 102 enters the lock region 224 from the enlarged region 223 while the head 101 of the stud 100 is inserted into the enlarged region 223, the lock piece 231 needs to be pressed up in a direction departing from the anchor plate 220 so that the head 101 of the stud 100 passes through the lock piece 231. Accordingly, it is difficult to fix the anchor device 210 to the stud 100.

Thus, it is a second object of the present invention to provide a seat belt anchor device with which an anchor device can be easily fixed to a stud.

To solve the problem, a seat belt anchor device according to a first aspect of the present invention is a seat belt anchor device to be fixed to a stud provided to a vehicle body and including a shank and a head having a diameter larger than a diameter of the shank, the seat belt anchor device including: an anchor plate including a loop attached portion that fixes a loop formed at one end of a seat belt webbing, and having an opening extending from the loop attached portion in a direction opposite to the seat belt webbing and including an enlarged region into which the head of the stud is allowed to be inserted and a lock region in which the head of the stud is not allowed to enter from the enlarged region but the shank of the stud is allowed to enter; a protector attached to the anchor plate and including a bridge portion disposed over the enlarged region on a side opposite to the vehicle body with respect to the enlarged region so that the loop is held between the protector and the loop attached portion; and a stopper attached to the anchor plate and configured to engage with the head of the stud when the shank of the stud enters the lock region from the enlarged region.

With the above-described configuration, since the loop formed at the one end of the seat belt webbing is held between the loop attached portion of the anchor plate and the bridge portion of the protector, the loop does not interfere with the head of the stud when the head of the stud is inserted into the enlarged region of the opening. Moreover, since the bridge portion of the protector extends over the enlarged region on the side opposite to the vehicle body with respect to the enlarged region and does not divide the enlarged region on an identical plane, a space up to the vicinity of the loop in the enlarged region can be used as the insertion space of the head of the stud. Thus, the anchor plate can be easily attached to the stud.

The protector may include a cover portion covering at least an edge of the loop attached portion on a side of the opening. With this configuration, the seat belt webbing contacts the cover portion of the protector, not the edge of the loop attached portion on the side of the opening. Thus, even when strong tension acts on the seat belt webbing, stress concentration to a point of the seat belt webbing can be reduced to maintain the durability of the seat belt webbing.

The protector may include a pair of sidewalls connected with both ends of the bridge portion and positioned on both sides of the stopper. With this configuration, it is possible to prevent release of engagement by the stopper due to contact of an object with the stopper after the seat belt anchor device is fixed to the stud.

A height from the anchor plate to top surfaces of the pair of sidewalls may be set to be larger than a height from the anchor plate to an uppermost point of the stopper before the seat belt anchor device is fixed to the stud. With this configuration, the above-described engagement release prevention effect can be more significantly achieved.

The stopper may include a first plate portion that contacts the anchor plate, a second plate portion facing the first plate portion with a gap interposed between the first and second plate portions, and a turned portion that couples end portions of the first plate portion and the second plate portion on a side opposite to the loop attached portion, and the protector may include a correction portion that contacts the second plate portion from a side of the anchor plate. With this configuration, even when variation occurs to a gap between the first plate portion and the second plate portion due to manufacturing error of the stopper, the gap between the first plate portion and the second plate portion can be made uniform after assembly of the anchor plate, the protector, and the stopper.

The correction portion may be provided to the bridge portion, and the bridge portion may be provided with a recess for inserting a tool between the second plate portion of the stopper and the correction portion. With this configuration, when engagement between the stopper and the head of the stud is to be released, a tool can be easily inserted between the second plate portion and the correction portion.

The stopper may include a guide piece that guides a head of the stopper in an insertion direction when the shank of the stud enters the lock region from the enlarged region, and the guide piece may be positioned in the enlarged region of the opening and tilted closer to the vehicle body from the lock region toward the enlarged region. With this configuration, when the stud is moved from the enlarged region toward the lock region while the head of the stud is placed in the enlarged region without passing through the enlarged region of the opening, the head of the stud is guided by the guide piece and automatically moves in an axial direction of the stud. Thus, the anchor plate can be more easily attached to the stud.

The protector may include a pair of regulation portions positioned on both sides of the enlarged region of the opening, and the regulation portions may regulate a moving amount of the head of the stud so that the shank of the stud does not contact the guide piece when the shank of the stud enters the lock region from the enlarged region. With this configuration, the stud can be smoothly moved from the enlarged region to the lock region.

A seat belt anchor device according to a second aspect of the present invention is a seat belt anchor device to be fixed to a stud provided to a vehicle body and including a shank and a head having a diameter larger than a diameter of the shank, the seat belt anchor device including: an anchor plate having a first opening that fixes a loop formed at one end of a seat belt webbing and having a second opening including an enlarged region into which the head of the stud is allowed to be inserted and a lock region that extends from the enlarged region in a direction opposite to the first opening and in which the head of the stud is not allowed to enter from the enlarged region but the shank is allowed to enter; and a stopper attached to the anchor plate and including a lock piece that allows the head to pass when the anchor plate is moved in a direction from the second opening toward the first opening while the head of the stud is inserted into the enlarged region of the second opening, and prevents the head from returning to the enlarged region when the shank of the stud enters the lock region, and a guide piece that guides the head when the shank enters the lock region from the enlarged region. The guide piece is positioned in the enlarged region and tilted closer to the vehicle body from the lock region toward the enlarged region.

With the above-described configuration, the stopper includes the guide piece. Thus, when the anchor plate is moved so that the shank of the stud enters the lock region from the enlarged region while the head of the stud is placed in the enlarged region without passing through the enlarged region of the second opening, the head of the stud is guided by the guide piece and automatically moves in the axial direction of the stud. Thus, the anchor device can be easily fixed to the stud.

The guide piece may be provided at a position facing the lock piece in a thickness direction of the anchor plate, and the head may be guided so that the head presses up the lock piece in a direction departing from the anchor plate when the shank enters the lock region from the enlarged region. With this configuration, since the head of the stud being guided by the guide piece presses up the lock piece in the direction departing from the anchor plate, a worker does not need to apply large force on the anchor plate in the thickness direction orthogonal to the moving direction. Thus, the anchor device can be more easily fixed to the stud.

The stopper may include a biasing piece that is interposed between the head and the anchor plate to bias the head in a direction departing from the anchor plate when the shank enters the lock region from the enlarged region. With this configuration, when the anchor device is fixed to the stud, the anchor plate is pressed against the vehicle body by biasing force of the biasing piece of the stopper. Thus, the anchor plate is prevented from vibrating relative to the stud and generating abnormal noise. Moreover, since the biasing piece is interposed between the head of the stud and the anchor plate, the head of the stud prevents for example, a leg or baggage of a passenger of a vehicle from directly contacting the biasing piece. In other words, the head of the stud protects the biasing piece of the stopper. This improves the durability of the abnormal noise prevention function of the stopper.

For example, when a first direction is defined to be a direction from the first opening toward the second opening, and a second direction is defined to be a direction from the second opening toward the first opening, the biasing piece may extend from a position contacting the anchor plate in the first direction while floating off the anchor plate, and the guide piece may extend in the second direction in parallel to the biasing piece from an end portion of the biasing piece in the first direction.

Alternatively, when a first direction is defined to be a direction from the first opening toward the second opening, and a second direction is defined to be a direction from the second opening toward the first opening, the biasing piece may extend from a position contacting the anchor plate in the second direction while floating off the anchor plate, and the guide piece may extend in the second direction from an end portion of the biasing piece in the second direction. With this configuration, the biasing piece and the guide piece are continuous, and thus the shape of the stopper can be simplified as compared to a case in which the biasing piece and the guide piece are parallel as described above.

For example, the stopper may include a first plate portion that contacts the anchor plate, a second plate portion facing the first plate portion with a gap interposed between the first and second plate portions, and a turned portion that couples end portions of the first plate portion and the second plate portion on a side opposite to the first opening, the lock piece may be provided to the second plate portion, and the biasing piece and the guide piece may be provided to the first plate portion.

A seat belt anchor device according to a third aspect of the present invention is a seat belt anchor device to be fixed to a stud provided to a vehicle body and including a shank and a head having a diameter larger than a diameter of the shank, the seat belt anchor device including: an anchor plate having a first opening that fixes a loop formed at one end of a seat belt webbing and having a second opening including an enlarged region into which the head of the stud is allowed to be inserted and a lock region that extends from the enlarged region in a direction opposite to the first opening and in which the head of the stud is not allowed to enter from the enlarged region but the shank is allowed to enter; and a stopper attached to the anchor plate and including a lock piece that allows the head to pass when the anchor plate is moved in a direction from the second opening toward the first opening while the head of the stud is inserted into the enlarged region of the second opening, and prevents the head from returning to the enlarged region when the shank of the stud enters the lock region. The anchor plate is provided with, on both sides of the lock region, guide surfaces that guide the head when the shank enters the lock region from the enlarged region, and the guide surfaces are tilted closer to the vehicle body from the lock region toward the enlarged region.

With the above-described configuration, the anchor plate is provided with the guide surface. Thus, when the anchor plate is moved so that the shank of the stud enters the lock region from the enlarged region while the head of the stud is placed in the enlarged region without passing through the enlarged region of the opening, the head of the stud is guided by the guide surface and automatically moves in the axial direction of the stud. Thus, the anchor device can be easily fixed to the stud.

The stopper may include a biasing piece that is interposed between the head and the anchor plate to bias the head in a direction departing from the anchor plate when the shank enters the lock region from the enlarged region. With this configuration, when the anchor device is fixed to the stud, the anchor plate is pressed against the vehicle body by biasing force of the biasing piece of the stopper. Thus, the anchor plate is prevented from vibrating relative to the stud and generating abnormal noise. Moreover, since the biasing piece is interposed between the head of the stud and the anchor plate, the head of the stud prevents for example, a leg or baggage of a passenger of a vehicle from directly contacting the biasing piece. In other words, the head of the stud protects the biasing piece of the stopper. This improves the durability of the abnormal noise prevention function of the stopper.

With the seat belt anchor device according to the first aspect of the present invention, the anchor plate can be easily attached to the stud. With the seat belt anchor devices according to the second and third aspects of the present invention, the anchor device can be easily fixed to the stud.

The above object, other objects, features and advantages of the present invention will be apparent from the following detailed description of preferred embodiments with reference to the attached drawings.

BRIEF DESCRIPTION OF THE DRAWINGS

FIGS. 7A and 7B are a transverse sectional view and a longitudinal sectional view, respectively, of a state after the anchor device illustrated in FIG. 1 is fixed to the stud (FIG. 7A is a cross-sectional view taken along line A-A in FIG. 7B);

FIGS. 14A and 14B are a transverse sectional view and a longitudinal sectional view, respectively, of a state of the middle of fixing the anchor device illustrated in FIG. 1 to the stud (FIG. 14A is a cross-sectional view taken along line A-A in FIG. 14B);

DETAILED DESCRIPTION OF PREFERRED EMBODIMENTS

First Embodiment

Figure 1:
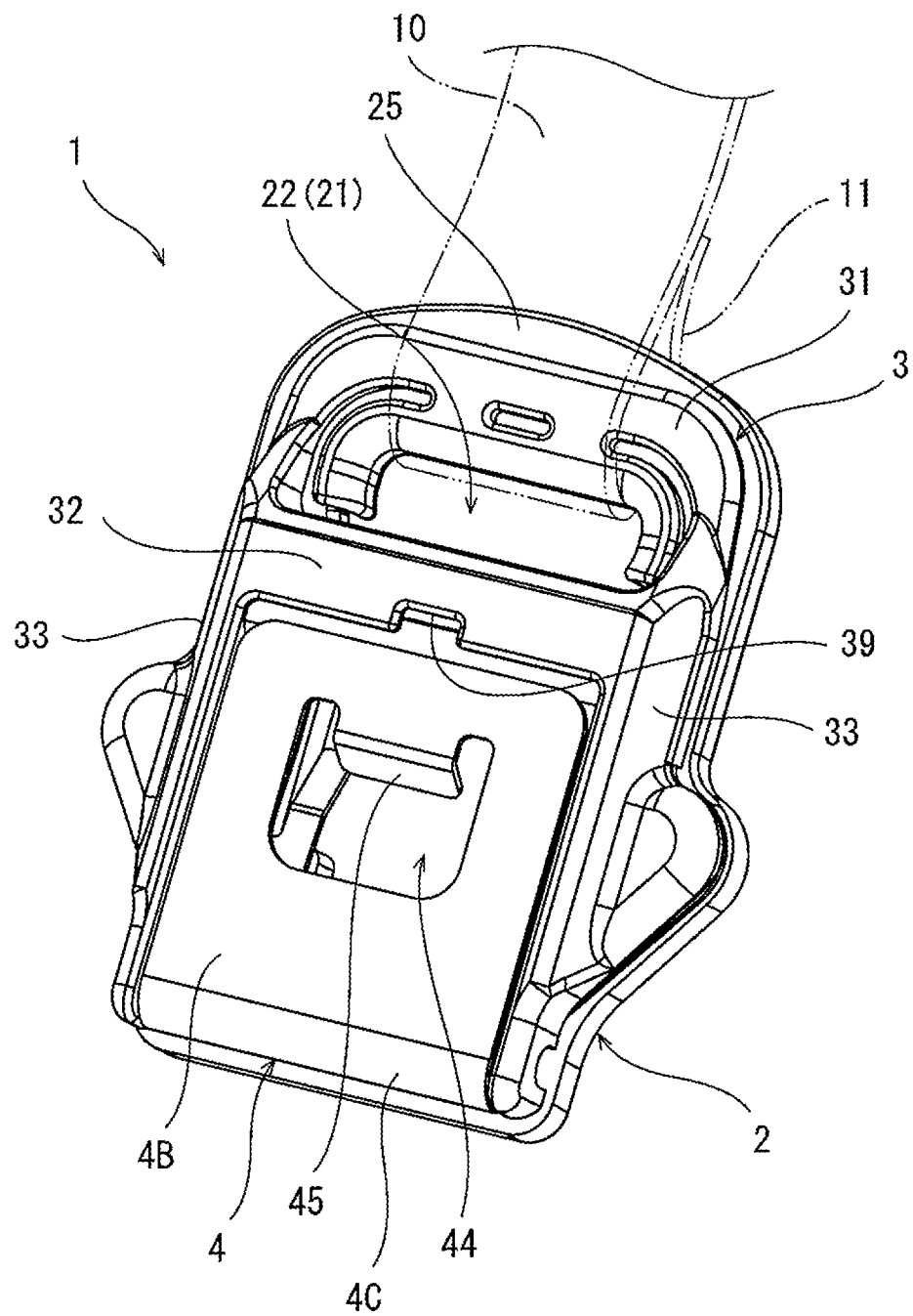
FIG. 1 is a perspective view of a seat belt anchor device according to a first embodiment of the present invention.

FIGS. 1 to 4B illustrate a seat belt anchor device 1 according to a first embodiment of the present invention. As illustrated in FIGS. 7A and 7B, the anchor device 1 is fixed to a stud 6 provided to a vehicle body 7.

The stud 6 includes a shank 62, a head 61 having a diameter larger than that of the shank 62, and a screw portion 63 having a diameter smaller than that of the shank 62. The head 61, the shank 62, and the screw portion 63 are arranged in the stated order. A spacer 64 that planarly contacts the vehicle body 7 is fixed to a stepped portion between the shank 62 and the screw portion 63.

The anchor device 1 includes an anchor plate 2, a stopper 4, and a protector 3, the stopper 4 and the protector 3 being attached to the anchor plate 2. The anchor plate 2 is made of metal. The stopper 4 is a fabricated thin plate made of metal. The protector 3 is made of resin in the present embodiment, but may be made of metal.

The thickness of the anchor plate 2 is set to be smaller than the length of the shank 62 of the stud 6. In the present embodiment, the anchor plate 2 is pressed against the vehicle body 7 through the spacer 64 when the anchor device 1 is fixed to the stud 6. However, the spacer 64 may be omitted, and the anchor plate 2 may be pressed against a stepped portion between the head 61 and the shank 62 of the stud 6 so that the anchor plate 2 floats off the vehicle body 7.

The anchor plate 2 includes a loop attached portion 25 that fixes a loop 11 formed at one end of a seat belt webbing 10. The loop 11 is formed by winding the seat belt webbing 10 around the loop attached portion 25. In other words, the loop attached portion 25 extends in a width direction of the seat belt webbing 10.

In addition, the anchor plate 2 has an opening 21 extending from the loop attached portion 25 in a direction opposite to the seat belt webbing 10. Thus, the extension direction of the opening 21 is an axial direction of the seat belt webbing 10. Hereinafter, for the purpose of illustration, the extension direction of the opening 21 is also referred to as an up-down direction (the up direction is on the loop attached portion 25 side, and the down direction is on a side opposite thereto).

The opening 21 includes an enlarged region 22 on the loop attached portion 25 side, and a lock region 23 at a leading end. The enlarged region 22 is a region into which the head 61 of the stud 6 is allowed to be inserted, and the lock region 23 is a region in which the head 61 of the stud 6 is not allowed to enter from the enlarged region 22 but the shank 62 is allowed to enter. Specifically, the width of the enlarged region 22 is larger than the diameter of the head 61 of the stud 6, and the width of the lock region 23 is smaller than the diameter of the head 61 of the stud 6 and larger than the diameter of the shank 62.

More specifically, a lower portion of the enlarged region 22 is a straight portion having a constant width, and an upper portion of the enlarged region 22 is a spreading portion having a width that spreads toward an upper place. The anchor plate 2 is provided with a pair of through-holes 26 for a rivet 5 to be described later on both sides of the straight portion of the enlarged region 22.

In the present embodiment, the length of the enlarged region 22 in the extension direction of the opening 21 is set to relatively long, and the length of the lock region 23 is set to be relatively short. This is for a guide piece 43 of the stopper 4, which is described later.

The stopper 4 overlaps with the anchor plate 2 around the lock region 23 of the opening 21. The stopper 4 engages with the head 61 of the stud 6 when the shank 62 of the stud 6 has entered the lock region 23 from the enlarged region 22.

Figure 2:
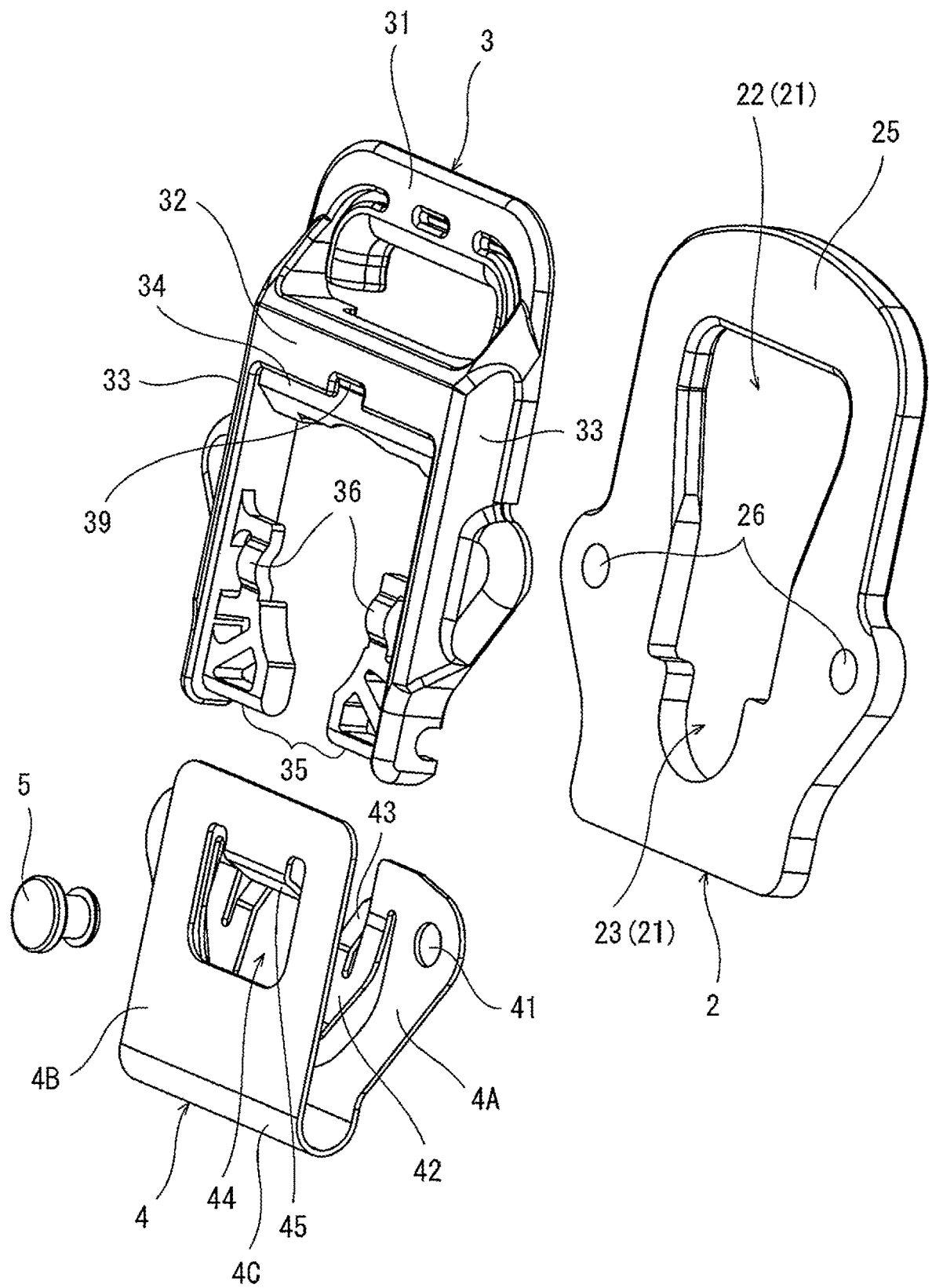
FIG. 2 is an exploded perspective view of the anchor device illustrated in FIG. 1 viewed from a front side.
Figure 3:
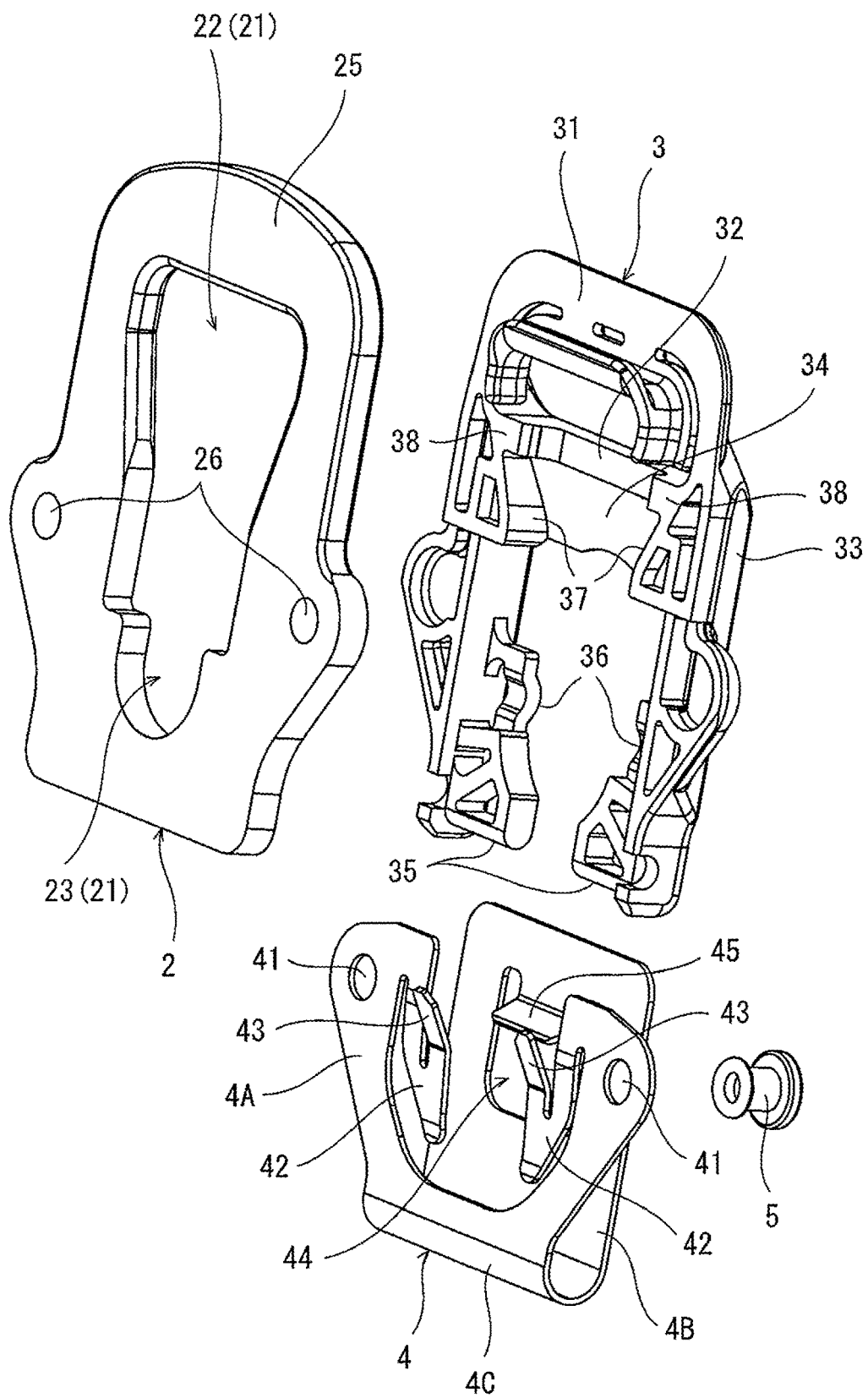
FIG. 3 is an exploded perspective view of the anchor device illustrated in FIG. 1 viewed from a back side.
Figure 4A:
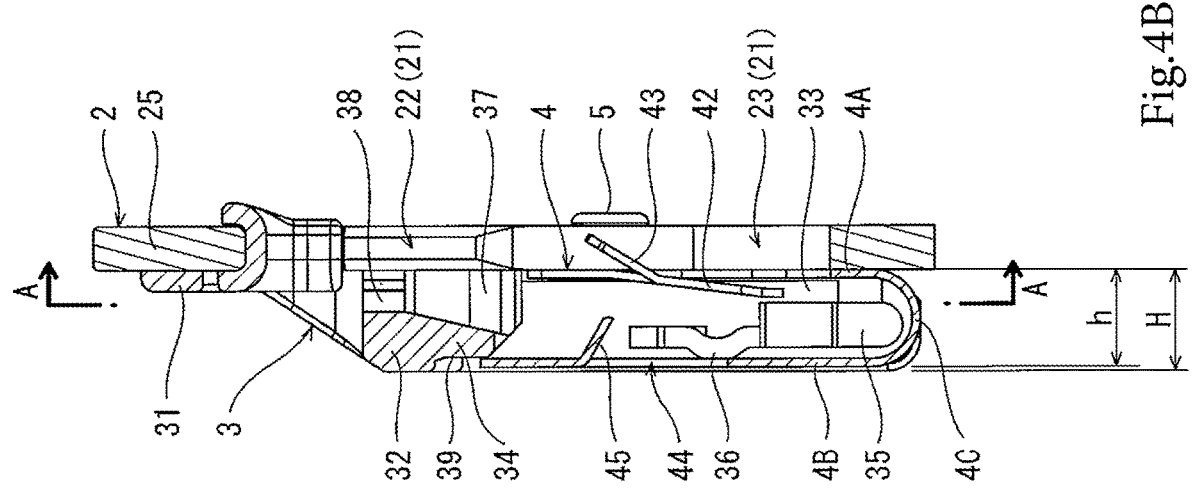
FIGS. 4A and 4B are a transverse sectional view and a longitudinal sectional view, respectively, of the anchor device illustrated in FIG. 1 (FIG. 4A is a cross-sectional view taken along line A-A in FIG. 4B)
Figure 4B:
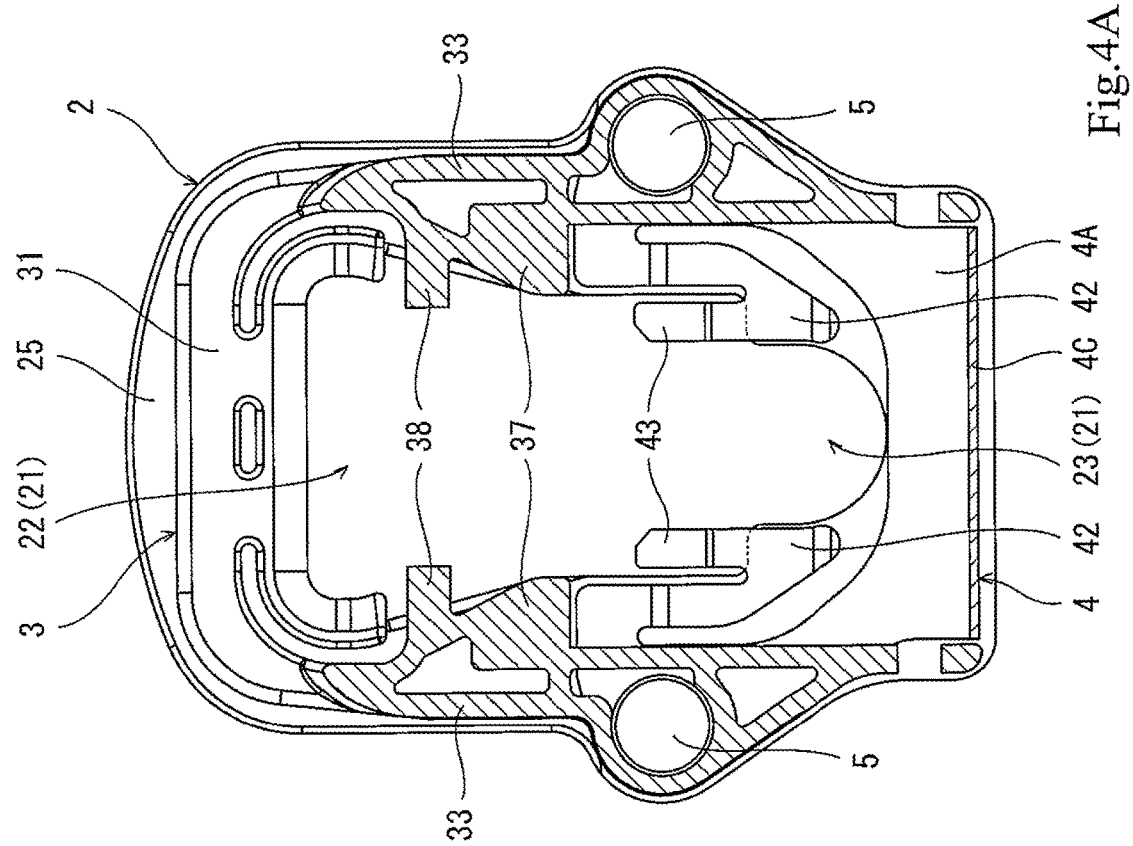
Figure 19:
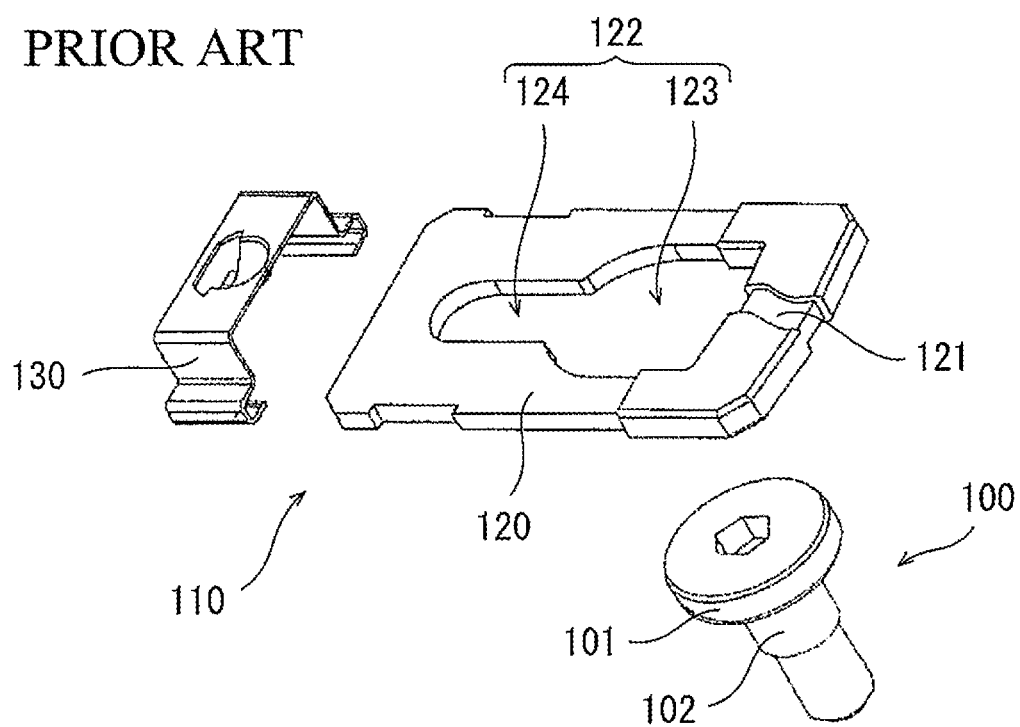
FIG. 19 is an exploded perspective view of a conventional seat belt anchor device.

In the present embodiment, the stopper 4 is attached to the anchor plate 2 by a pair of the rivets 5 (only one of the rivets 5 is illustrated in FIGS. 2 and 3). However, similarly to an anchor device 110 illustrated in FIG. 19, the stopper 4 may be attached to the anchor plate 2 through simple engagement.

The stopper 4 is bent in a U shape opened upward in side view. Specifically, the stopper 4 includes a first plate portion 4A that contacts the anchor plate 2, a second plate portion 4B separated from the first plate portion 4A with a gap interposed therebetween, and a turned portion 4C that couples end portions of the first plate portion 4A and the second plate portion 4B on a side opposite to the loop attached portion 25.

The first plate portion 4A has a substantially U shape opened upward. A pair of through-holes 41 for the rivets 5 are provided at both upper portions of the first plate portion 4A. The opening width of the first plate portion 4A is set to be larger than the width of the straight portion of the enlarged region 22 of the opening 21.

A pair of biasing pieces 42 are provided inside both upper portions of the first plate portion 4A. The biasing pieces 42 extend downward from both upper portions of the first plate portion 4A to both sides of the lock region 23 of the opening 21.

When the shank 62 of the stud 6 has entered the lock region 23 from the enlarged region 22, the biasing pieces 42 are interposed between the head 61 of the stud 6 and the anchor plate 2 as illustrated in FIGS. 7A and 7B to bias the head 61 in a direction departing from the anchor plate 2. Accordingly, the anchor plate 2 is pressed against the vehicle body 7, thereby preventing relative vibration between the stud 6 and the anchor plate 2.

Figure 6A:
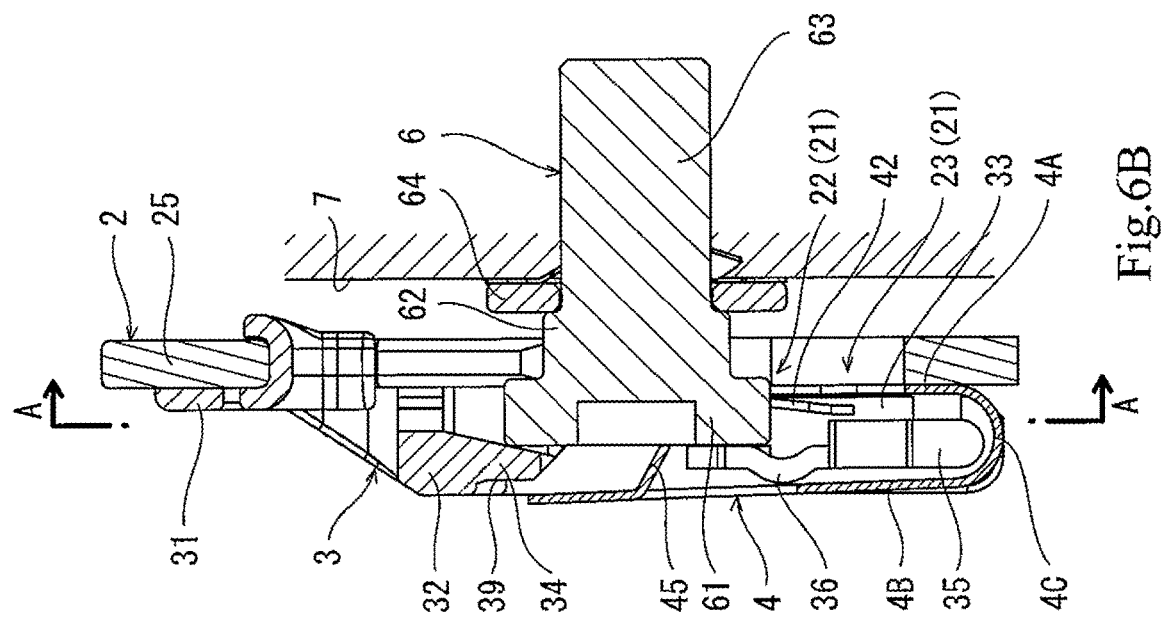
FIGS. 6A and 6B are a transverse sectional view and a longitudinal sectional view, respectively, of a state of the middle of fixing the anchor device illustrated in FIG. 1 to the stud (FIG. 6A is a cross-sectional view taken along line A-A in FIG. 6B)
Figure 6B:
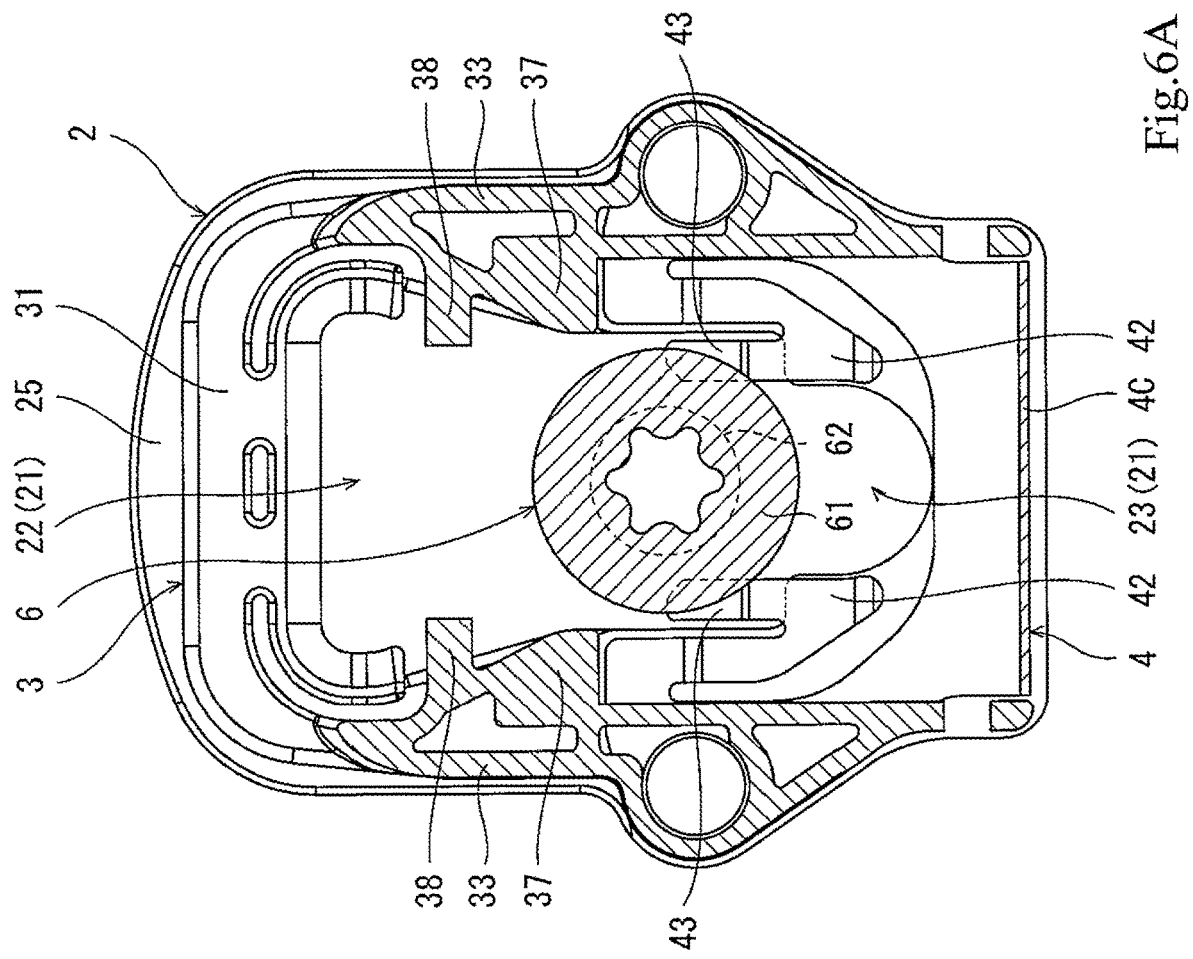

In addition, the guide piece 43 extends upward from each lower portion of the biasing pieces 42. The guide piece 43 guides the head 61 of the stud 6 in an insertion direction when the shank 62 of the stud 6 enters the lock region 23 from the enlarged region 22. More specifically, the guide piece 43 is positioned in the enlarged region 22 of the opening 21 and tilted closer to the vehicle body 7 from the lock region 23 toward the enlarged region 22. With such a shape, when the shank 62 of the stud 6 enters the lock region 23 from the enlarged region 22, the head 61 of the stud 6 inserted into the enlarged region 22 of the opening 21 moves in an axial direction of the stud 6 along the guide piece 43 while being lifted up to the surface of the anchor plate 2 as illustrated in FIGS. 6A and 6B.

The second plate portion 4B is provided with, substantially at a center, an opening 44 having a substantially rectangular shape. The second plate portion 4B is also provided with a lock piece 45 protruding downward toward the center of the opening 44. A lower portion of the lock piece 45 is bent toward the anchor plate 2. When the anchor plate 2 is operated upward so that the stud 6 moves from the enlarged region 22 toward the lock region 23 in a state (refer to FIGS. 5A and 5B) in which the head 61 of the stud 6 is inserted into the enlarged region 22 of the opening 21, the lock piece 45 elastically deforms to become separated from the anchor plate 2 and allow the head 61 to pass while contacting the head 61 (refer to FIGS. 6A and 6B). In addition, the lock piece 45 prevents the stud 6 from returning to the enlarged region 22 when the shank 62 of the stud 6 has entered the lock region 23 from the enlarged region 22 as illustrated in FIGS. 7A and 7B.

When the anchor device 1 is to be removed from the stud 6, an upper end of the second plate portion 4B is operated in the state illustrated in FIGS. 7A and 7B to elastically deform the entire second plate portion 4B so that the lock piece 45 is separated from the anchor plate 2. Accordingly, the stud 6 is allowed to return to the enlarged region 22.

In the present embodiment, the protector 3 is attached to a surface of the anchor plate 2 on a side opposite to the vehicle body 7. In the present embodiment, the protector 3 has substantially the same outline as that of the anchor plate 2.

Specifically, the protector 3 includes a cover portion 31 overlapping with the loop attached portion 25 of the anchor plate 2 and extending in the width direction of the seat belt webbing 10, and a pair of sidewalls 33 hanging down from both ends of the cover portion 31. The protector 3 also includes a bridge portion 32 extending in the width direction of the seat belt webbing 10 below the cover portion 31. Both ends of the bridge portion 32 are connected with the pair of sidewalls 33.

The cover portion 31 covers at least an edge of the loop attached portion 25 on a side of the opening 21. In the present embodiment, the cover portion 31 has a substantially L sectional shape, and covers not only the edge of the loop attached portion 25 on the side of the opening 21 but also most of a surface of the loop attached portion 25.

The pair of sidewalls 33 are positioned on both sides of the stopper 4. Heights from the anchor plate 2 to top surfaces of the pair of sidewalls 33 are set to be larger than a height from the anchor plate 2 to an uppermost point of the stopper 4 (in the present embodiment, a surface of the second plate portion 4B) in a state before the anchor device 1 is fixed to the stud 6.

The bridge portion 32 extends over the enlarged region 22 of the opening 21 on the side opposite to the vehicle body 7 with respect to the enlarged region 22 to hold the loop 11 between the bridge portion 32 and the loop attached portion 25 of the anchor plate 2. In other words, the bridge portion 32 is separated from the anchor plate 2 in the thickness direction of the anchor plate 2.

Figure 5A:
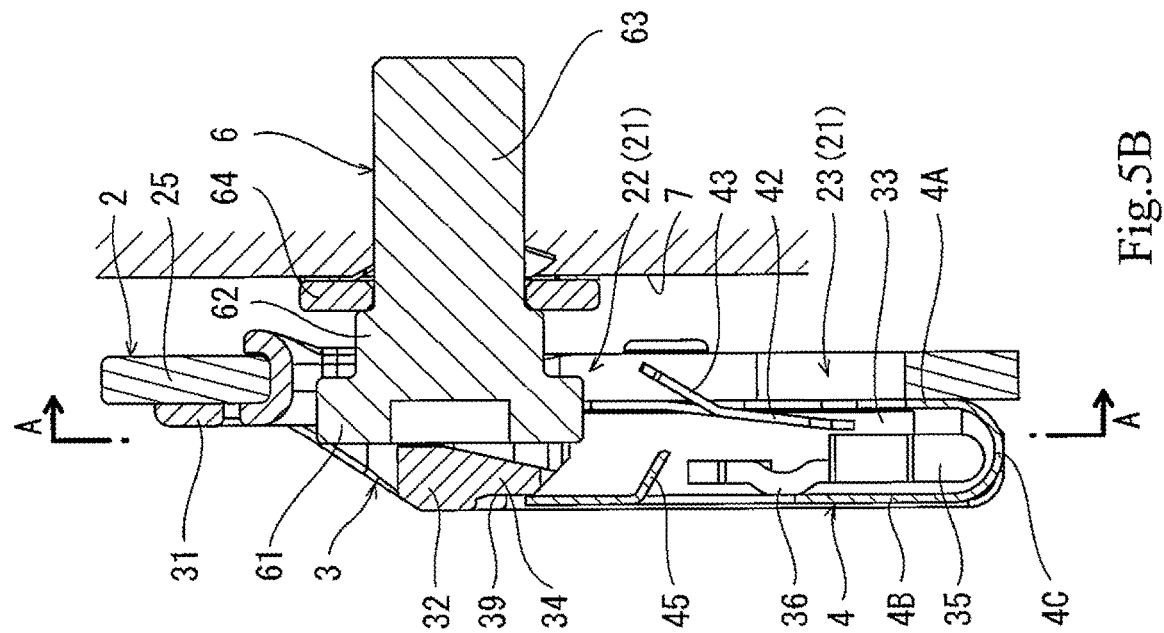
FIGS. 5A and 5B are a transverse sectional view and a longitudinal sectional view, respectively, of a state right before the anchor device illustrated in FIG. 1 is fixed to a stud (FIG. 5A is a cross-sectional view taken along line A-A in FIG. 5B)
Figure 5B:
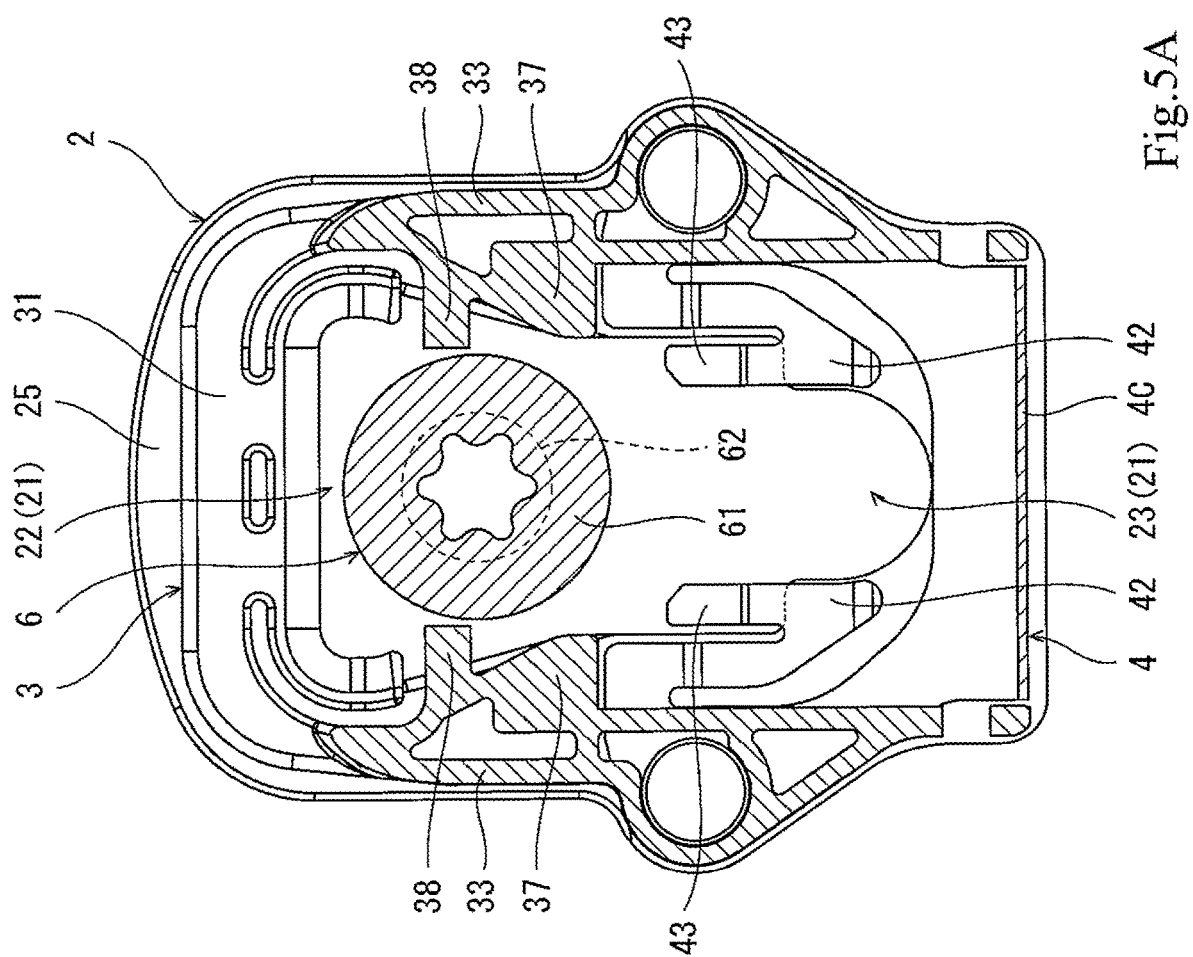

In the present embodiment, as illustrated in FIG. 5B, the distance from the anchor plate 2 to the bridge portion 32 in the thickness direction of the anchor plate 2 is shorter than the thickness of the head 61 of the stud 6. Thus, when the head 61 of the stud 6 is inserted into the enlarged region 22 of the opening 21, the head 61 of the stud 6 cannot pass through the enlarged region 22 at a position where the bridge portion 32 exists. However, the distance from the anchor plate 2 to the bridge portion 32 in the thickness direction of the anchor plate 2 may be longer than the thickness of the head 61 of the stud 6.

In addition, the protector 3 includes a pair of insertion portions 35 protruding inward from lower portions of the pair of sidewalls 33, a pair of first correction portions 36 provided to the respective insertion portions 35, and a second correction portion 34 provided to the bridge portion 32.

The insertion portions 35 are portions inserted between the first plate portion 4A and the second plate portion 4B of the stopper 4. Each first correction portion 36 protrudes from the corresponding insertion portion 35 toward the second plate portion 4B. Similarly to the bridge portion 32, the second correction portion 34 extends in the width direction of the seat belt webbing 10.

The first correction portions 36 and the second correction portion 34 contact the second plate portion 4B of the stopper 4 from a side of the anchor plate 2. In other words, the protector 3 is pressed against the anchor plate 2 by biasing force of the stopper 4 as a plate spring. Either the first correction portions 36 or the second correction portions 34 may be omitted.

The bridge portion 32 is provided with a recess 39, recessed upward, for inserting a tool between the upper end of the second plate portion 4B of the stopper 4 and the second correction portion 34. The provision of the recess 39 allows a contact surface of the second correction portion 34 with the second plate portion 4B to extend upwardly. With this configuration, when engagement between the stopper 4 and the head 61 of the stud 6 is to be released, a tool can be easily inserted between the upper end of the second plate portion 4B and the second correction portion 34 and the second plate portion 4B of the stopper 4 can be easily elastically deformed so as to separate from the first plate portion 4A.

In addition, the protector 3 is provided with a pair of first regulation portions 38 at corner portions between the bridge portion 32 and the pair of sidewalls 33, and is provided with a pair of second regulation portions 37 at corner portions between the second correction portion 34 and the pair of sidewalls 33. The pair of first regulation portions 38 are positioned on both sides of the enlarged region 22 of the opening 21, and the pair of second regulation portions 37 are also positioned on both sides of the enlarged region 22 of the opening 21.

The first regulation portions 38 regulate the moving amount of the head 61 of the stud 6 in the width direction of the opening 21 so that the head 61 of the stud 6 is maintained substantially at the center of the enlarged region 22 when the head 61 of the stud 6 is inserted into the enlarged region 22 of the opening 21 as illustrated in FIGS. 5A and 5B.

The second regulation portions 37 regulate the moving amount of the head 61 of the stud 6 in the width direction of the opening 21 so that the shank 62 of the stud 6 does not contact the guide piece 43 of the stopper 4 when the shank 62 of the stud 6 enters the lock region 23 from the enlarged region 22 as illustrated in FIGS. 6A and 6B. When no second regulation portions 37 are provided, the stud 6 can move in the width direction of the opening 21 to a position at which the shank 62 contacts both sides of the enlarged region 22 at the anchor plate 2. Thus, the shank 62 of the stud 6 potentially contacts the guide piece 43 of the stopper 4.

However, when the second regulation portions 37 are provided as in the present embodiment, the shank 62 of the stud 6 does not contact the guide piece 43 of the stopper 4, and thus the stud 6 can smoothly move from the enlarged region 22 to the lock region 23.

As described above, in the anchor device 1 according to the present embodiment, since the loop 11 of the seat belt webbing 10 is held between the loop attached portion 25 of the anchor plate 2 and the bridge portion 32 of the protector 3, the loop 11 does not interfere with the head 61 of the stud 6 when the head 61 of the stud 6 is inserted into the enlarged region 22 of the opening 21. Moreover, since the bridge portion 32 of the protector 3 extends over the enlarged region 22 on the side opposite to the vehicle body 7 with respect to the enlarged region 22 and does not divide the enlarged region 22 on an identical plane, a space up to the vicinity of the loop 11 in the enlarged region 22 can be used as an insertion space for the head 61 of the stud 6. Thus, the anchor plate 2 can be easily attached to the stud 6.

In the present embodiment, the protector 3 includes the first correction portions 36 and the second correction portion 34. Thus, even when variation occurs to a gap between the first plate portion 4A and the second plate portion 4B due to manufacturing error of the stopper 4, the gap between the first plate portion 4A and the second plate portion 4B can be made uniform after assembly of the anchor plate 2, the protector 3, and the stopper 4.

In addition, in the present embodiment, the stopper 4 includes the guide piece 43. Thus, when the stud 6 is moved from the enlarged region 22 toward the lock region 23 while the head 61 of the stud 6 is placed in the enlarged region 22 without passing through the enlarged region 22 of the opening 21 as illustrated in FIG. 5B, the head 61 of the stud 6 is guided by the guide piece 43 and automatically moves in the axial direction of the stud 6. Thus, the anchor plate 2 can be more easily attached to the stud 6.

Modification

The protector 3 may include the bridge portion 32 only. In this case, the protector 3 may be made of metal. However, when the protector 3 also includes the cover portion 31 in addition to the bridge portion 32 as in the embodiment, the seat belt webbing 10 contacts the cover portion 31 of the protector 3, not the edge of the loop attached portion 25 on the side of the opening. Thus, even when strong tension acts on the seat belt webbing 10, stress concentration to a point of the seat belt webbing 10 can be reduced to maintain the durability of the seat belt webbing 10.

Alternatively, when the protector 3 includes the pair of sidewalls 33 in addition to the bridge portion 32 as in the embodiment, it is possible to prevent release of the engagement by the stopper 4 due to contact of an object with the stopper 4 after the anchor device 1 is fixed to the stud 6. Moreover, when the sidewalls 33 and the stopper 4 have a height relation as in the embodiment, the above-described effect of engagement release prevention can be more significantly achieved.

The guide piece 43 of the stopper 4 may be omitted. In this case, the length of the lock region 23 of the opening 21 may be increased and the length of the enlarged region 22 may be reduced by an amount corresponding to the guide piece 43.

Figure 8:
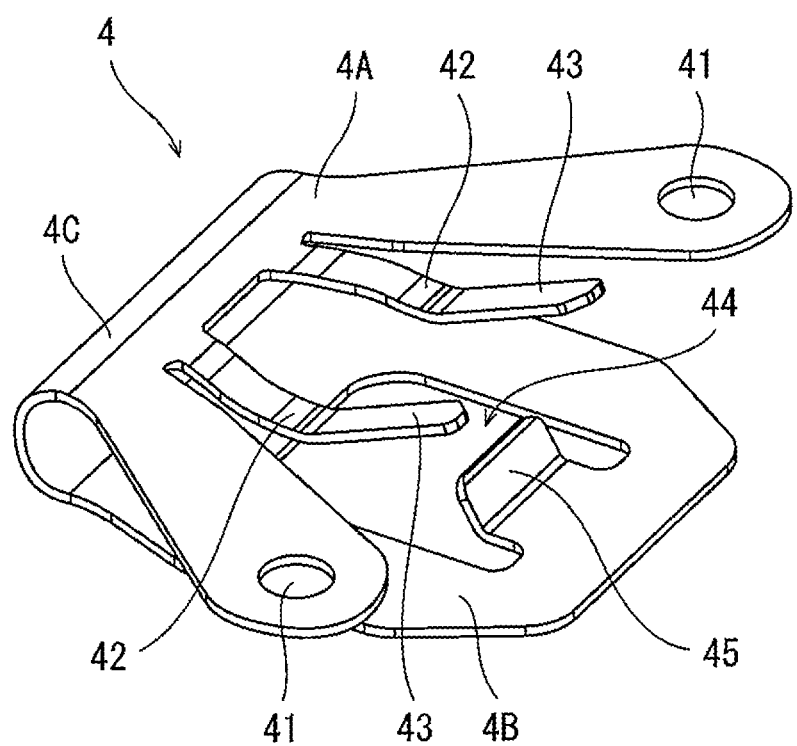
FIG. 8 is a perspective view of a stopper according to a modification.
Figure 9:
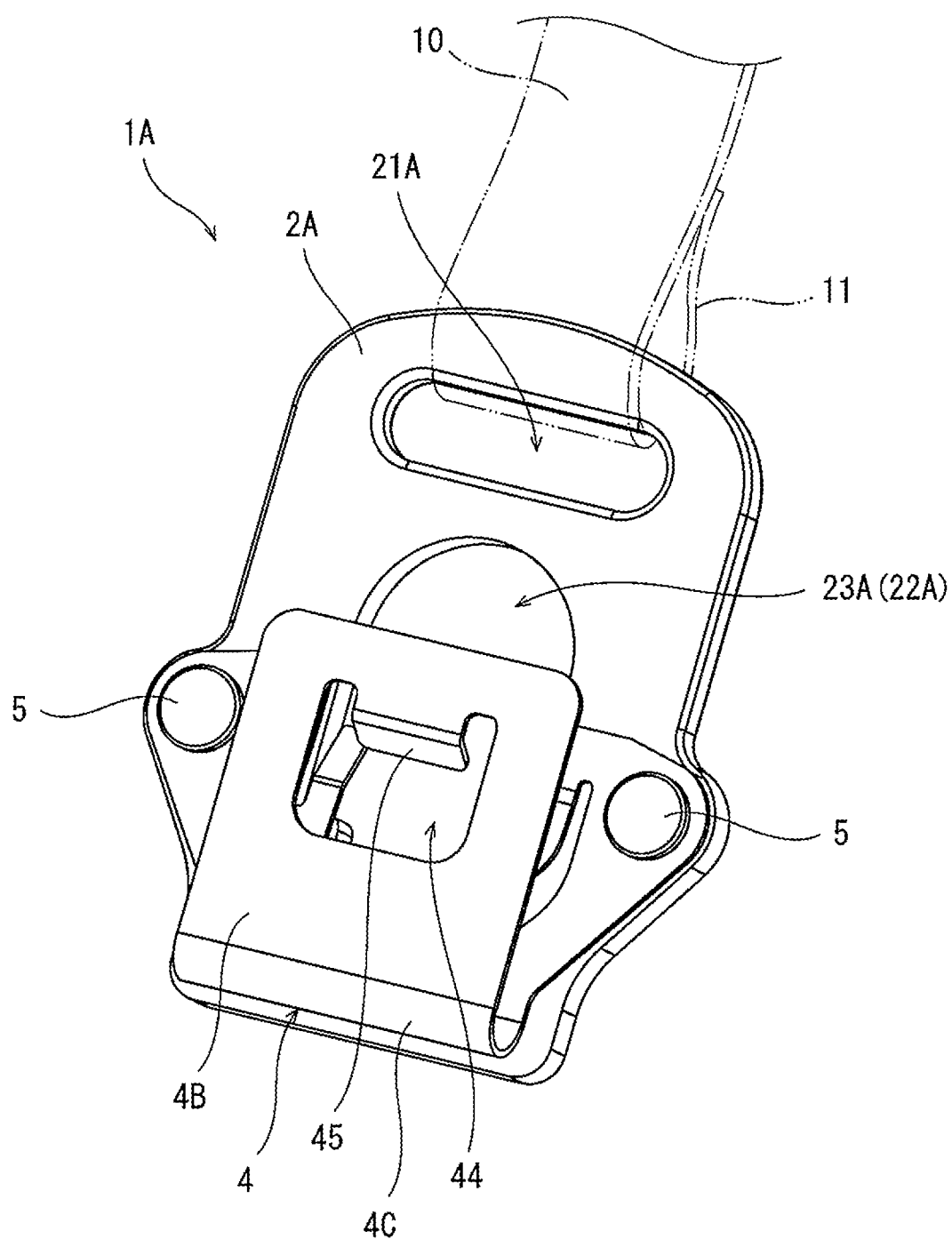
FIG. 9 is a perspective view of a seat belt anchor device according to a second embodiment of the present invention.

The shape of the stopper 4 may be changed as appropriate. For example, as illustrated in FIG. 8, the stopper 4 may be configured such that the biasing pieces 42 and the guide piece 43 are integrated and extend upward from a bottom portion of the first plate portion 4A. Alternatively, the stopper 4 may have the same shape as that of the anchor device 110 illustrated in FIG. 19.

Second Embodiment

FIGS. 9 to 12B illustrate a seat belt anchor device 1A according to a second embodiment of the present invention. In the present embodiment, an anchor plate 2A having another shape is employed in place of the protector 3 of the first embodiment.

The anchor device 1A includes the anchor plate 2A, and the stopper 4 as a metal plate spring. The thickness of the anchor plate 2A is set to be smaller than the length of the shank 62 of the stud 6. In the present embodiment, the anchor plate 2A is pressed against the vehicle body 7 through the spacer 64 when the anchor device 1A is fixed to the stud 6 (refer to FIG. 15B).

Figure 10:
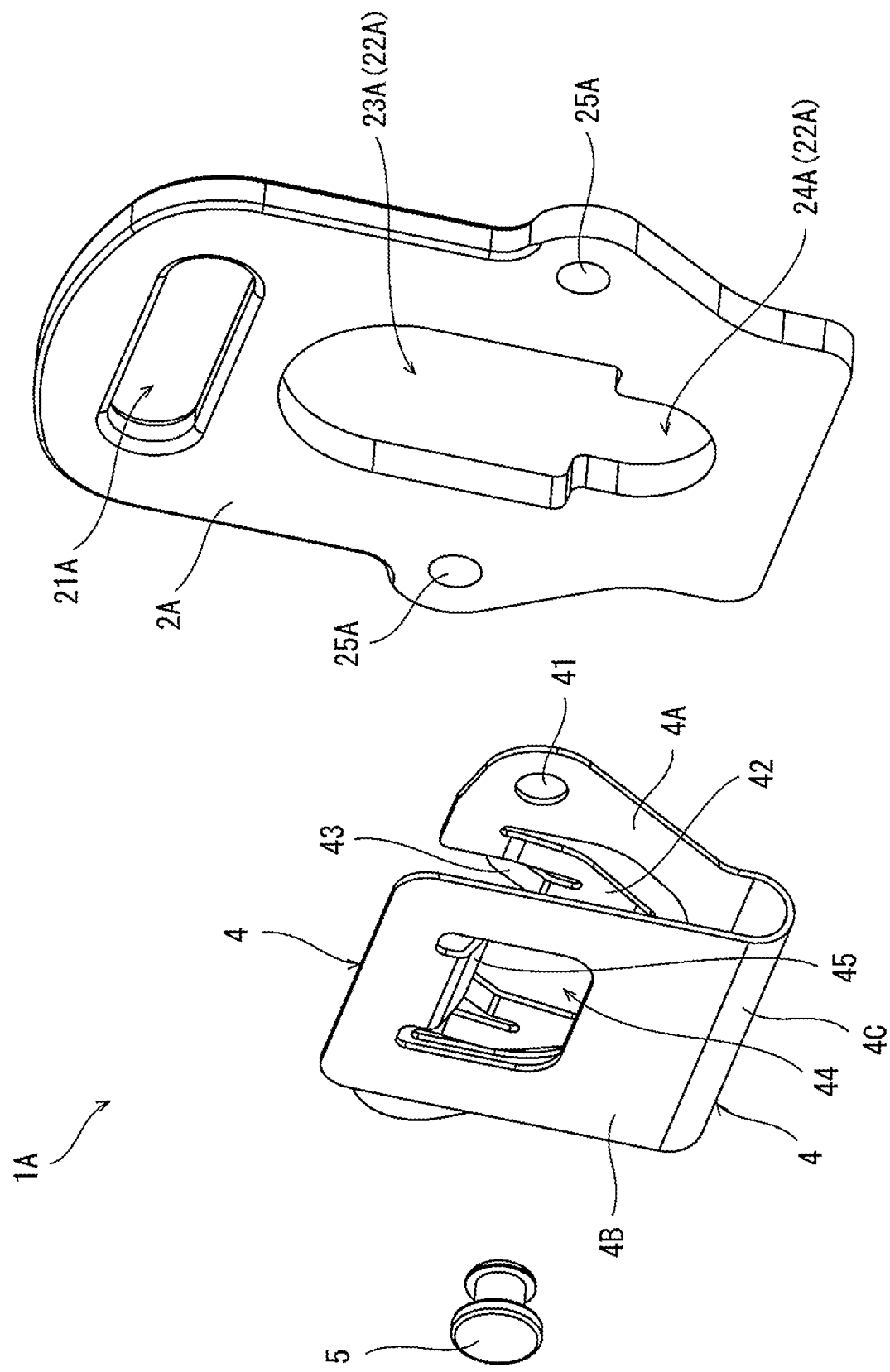
FIG. 10 is an exploded perspective view of the anchor device illustrated in FIG. 9 viewed from the front side.
Figure 11:
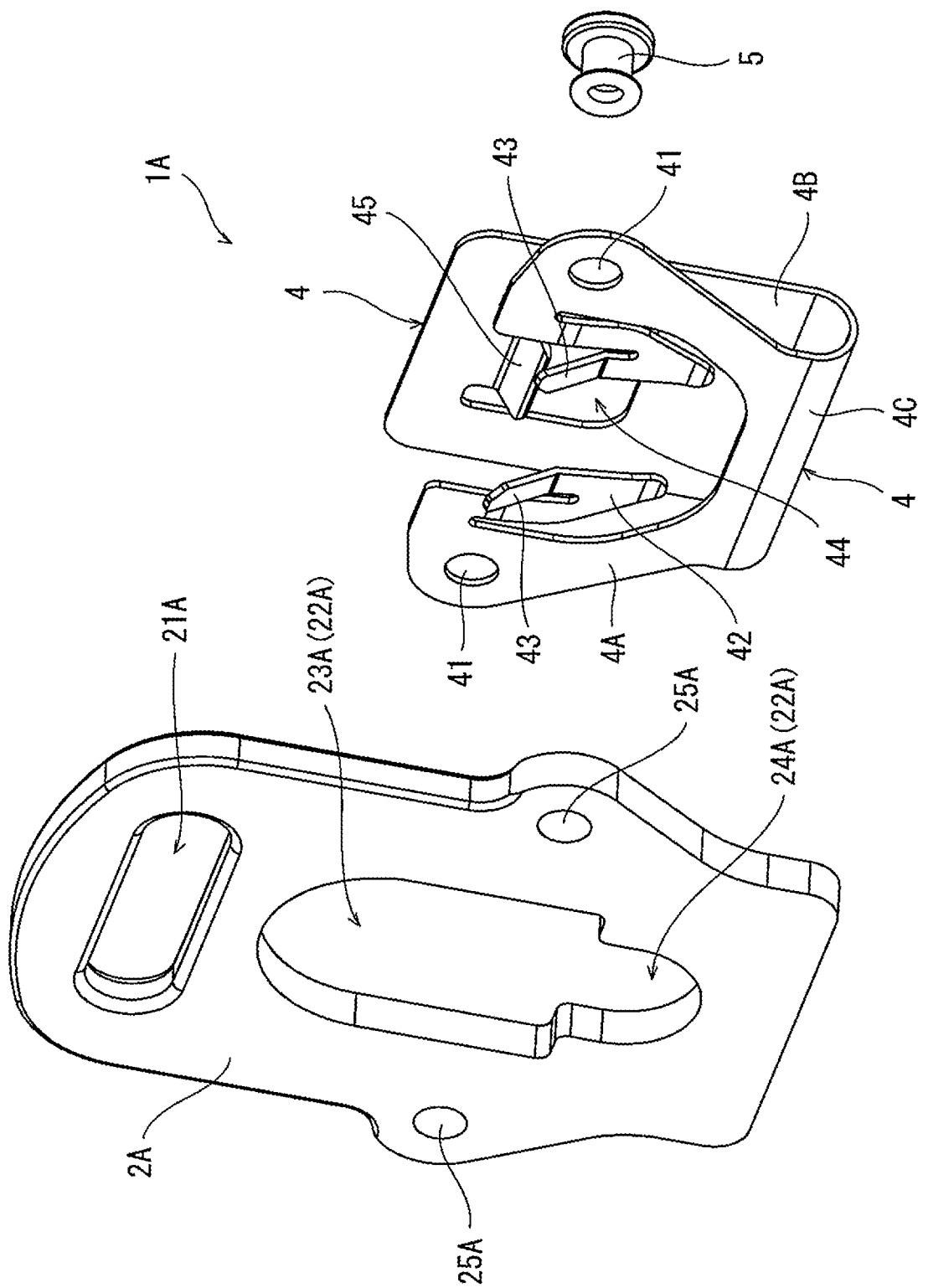
FIG. 11 is an exploded perspective view of the anchor device illustrated in FIG. 9 viewed from the back side.
Figure 12B:
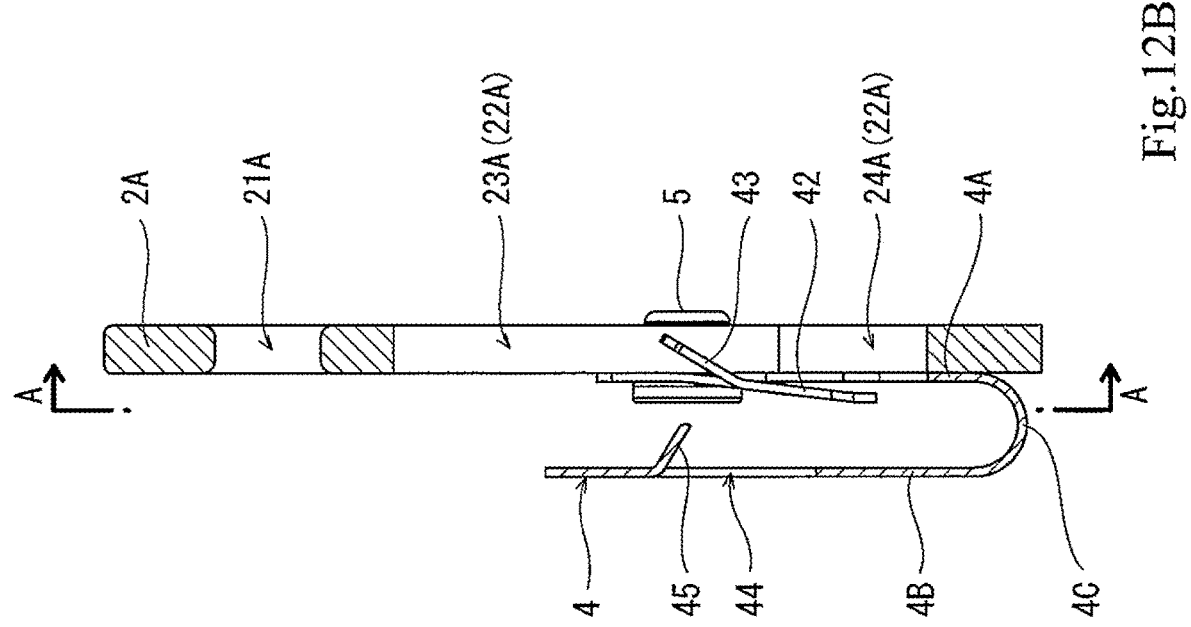
FIGS. 12A and 12B are a transverse sectional view and a longitudinal sectional view, respectively, of the anchor device illustrated in FIG. 1 (FIG. 12A is a cross-sectional view taken along line A-A in FIG. 12B)
Figure 12A:
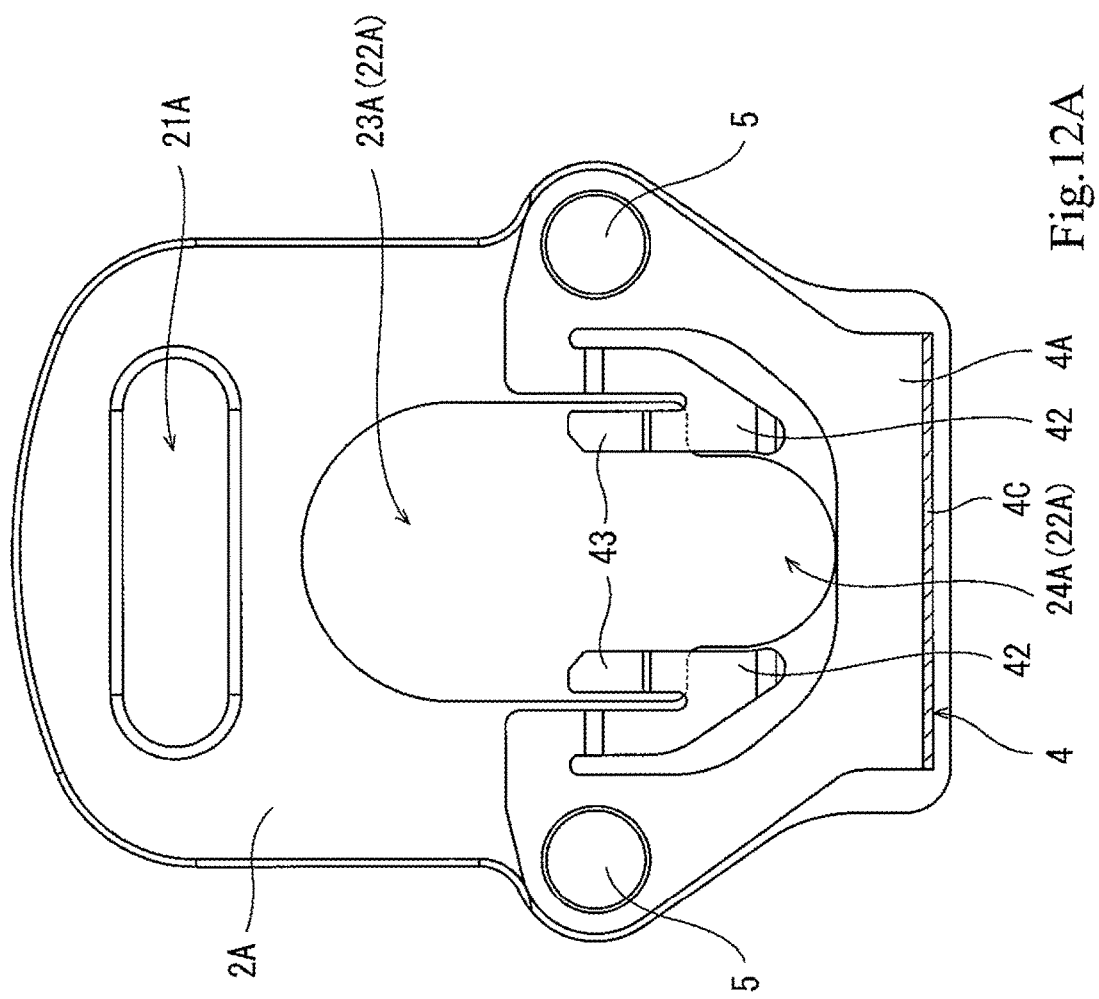

Similarly to the first embodiment, the stopper 4 is attached to the anchor plate 2A by the pair of rivets 5 (only one of the rivets 5 is illustrated in FIGS. 10 and 11). However, the stopper 4 may be attached to the anchor plate 2A by a screw or the like. The metal of which the stopper 4 is made is not particularly limited, but is, for example, steel.

The anchor plate 2A has a first opening 21A that fixes the loop 11 formed at one end of the seat belt webbing 10. The first opening 21A has an elongate hole shape extending in the width direction of the webbing 10. The anchor plate 2A also has a second opening 22A arranged side by side with the first opening 21A in the axial direction of the webbing 10. Hereinafter, for the purpose of illustration, a first direction from the first opening 21A toward the second opening 22A is also referred to as a down direction or downward, and a second direction from the second opening 22A to the first opening 21A is also referred to as an up direction or upward.

The second opening 22A includes an enlarged region 23A close to the first opening 21A, and a lock region 24A extending from the enlarged region 23A in a direction opposite to the first opening 21A. The enlarged region 23A is a region into which the head 61 of the stud 6 is allowed to be inserted, and the lock region 24A is a region in which the head 61 of the stud 6 is not allowed to enter from the enlarged region 23A but the shank 62 is allowed to enter. Thus, the width of the enlarged region 23A is larger than the diameter of the head 61 of the stud 6, and the width of the lock region 24A is smaller than the diameter of the head 61 of the stud 6 and larger than the diameter of the shank 62.

More specifically, an upper portion of the enlarged region 23A has a semicircular shape, and middle and lower portions of the enlarged region 23A each have a straight shape in a constant width. The anchor plate 2A is provided with a pair of through-holes 25A for the rivets 5 on both sides of the lower portion of the enlarged region 23A.

In the present embodiment, the length of the enlarged region 23A in the up-down direction is set to be relatively long, and the length of the lock region 24A is set to be relatively short. This is for the guide piece 43 of the stopper 4.

The stopper 4 overlaps with the anchor plate 2A around the lock region 24A of the second opening 22A. The stopper 4 engages with the head 61 of the stud 6 when the shank 62 of the stud 6 has entered the lock region 24A from the enlarged region 23A.

The stopper 4 is bent in a U shape opened upward in side view as described in the first embodiment. Specifically, the stopper 4 includes the first plate portion 4A that contacts with the anchor plate 2A, the second plate portion 4B separated from the first plate portion 4A with a gap interposed therebetween, and the turned portion 4C that couples lower portions (end portions on a side opposite to the first opening 21A) of the first plate portion 4A and the second plate portion 4B.

The first plate portion 4A has a substantially U shape opened upward. Specifically, the first plate portion 4A includes a pair of side edge portions positioned on both sides of the lower portion of the enlarged region 23A and the lock region 24A of the second opening 22A, and a base portion positioned below the lock region 24A. The through-holes 41 for the rivets 5 are provided at an upper portion of each side edge portion. The opening width of the first plate portion 4A (distance between the side edge portions) is set to be larger than the width of the enlarged region 23A of the second opening 22A.

The first plate portion 4A is provided with the pair of biasing pieces 42 and the pair of guide pieces 43. The pair of biasing pieces 42 are disposed on the inner side of both side edge portions of the first plate portion 4A, and the pair of guide pieces 43 are disposed on the inner side of the pair of biasing pieces 42.

More specifically, each biasing piece 42 is coupled with the upper portion of the corresponding side edge portion of the first plate portion 4A, and extends downward from a position contacting the anchor plate 2A while floating off the anchor plate 2A. The lower portion of the biasing piece 42 is positioned on a side of the lock region 24A and bent obliquely inward.

Figure 15A:
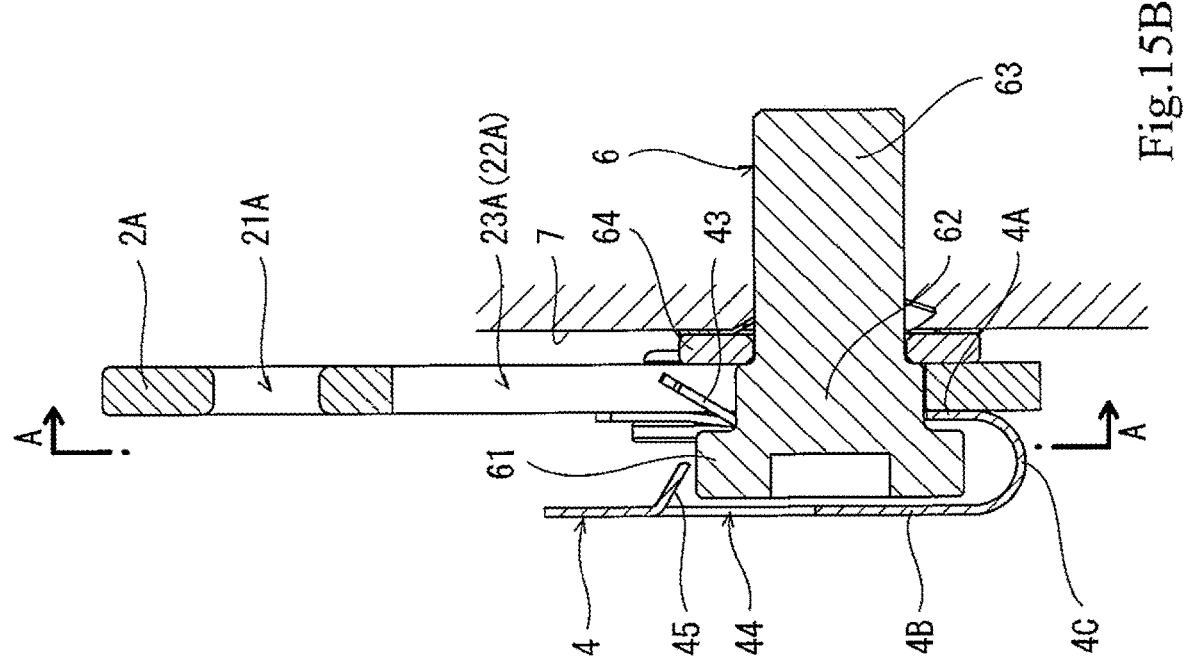
FIGS. 15A and 15B are a transverse sectional view and a longitudinal sectional view, respectively, of a state after the anchor device illustrated in FIG. 1 is fixed to the stud (FIG. 15A is a cross-sectional view taken along line A-A in FIG. 15B)
Figure 15B:
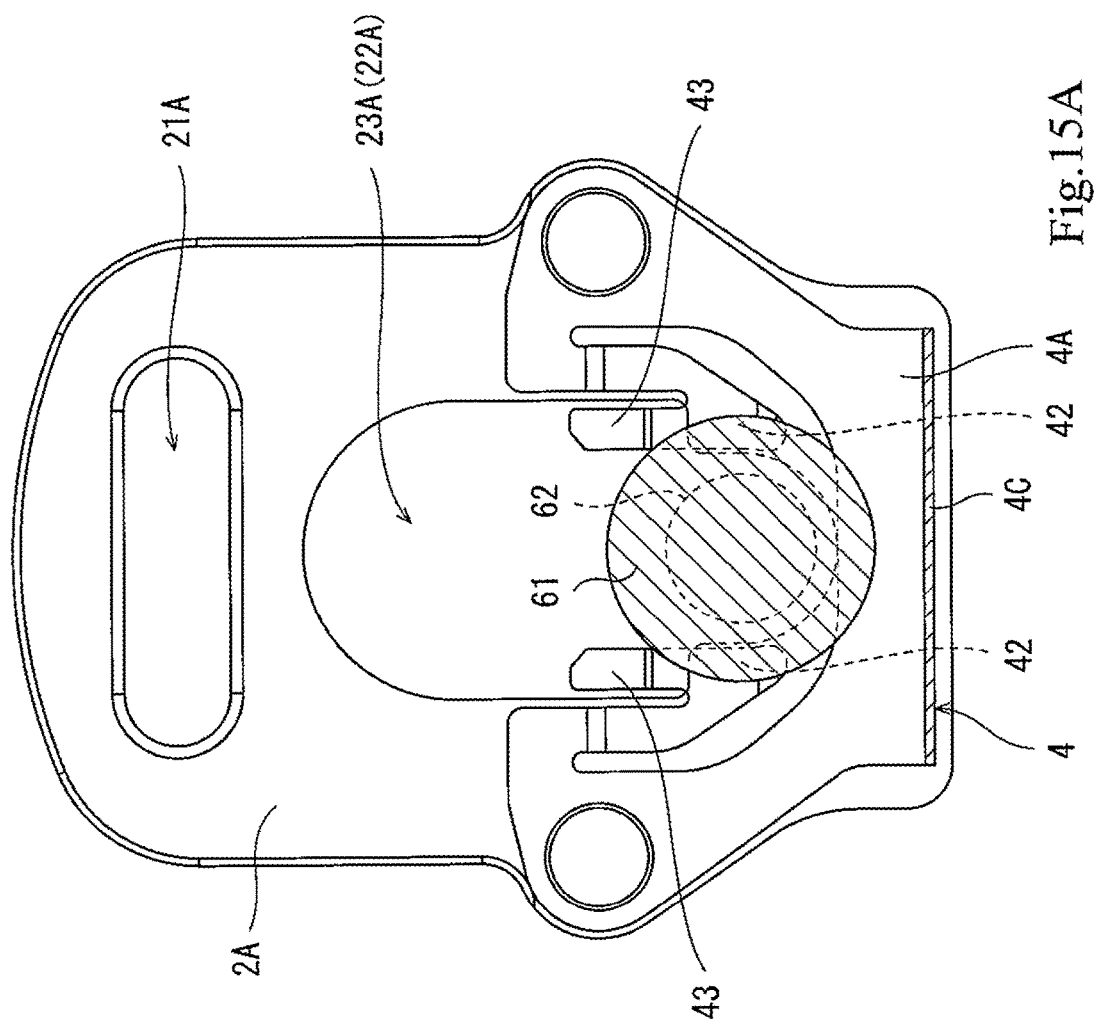
Figure 16:
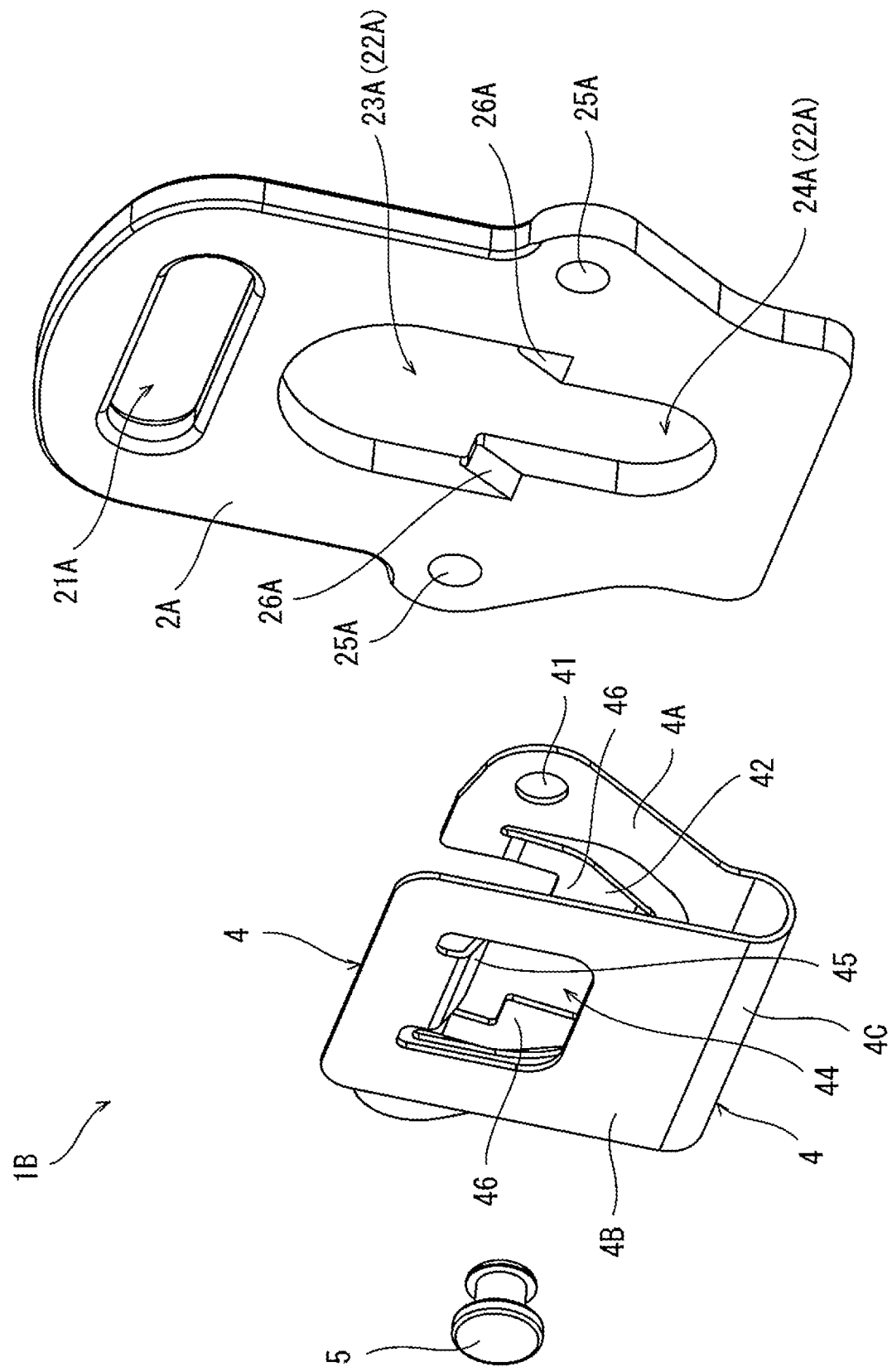
FIG. 16 is an exploded perspective view of a seat belt anchor device according to a third embodiment of the present invention viewed from the front side.
Figure 17:
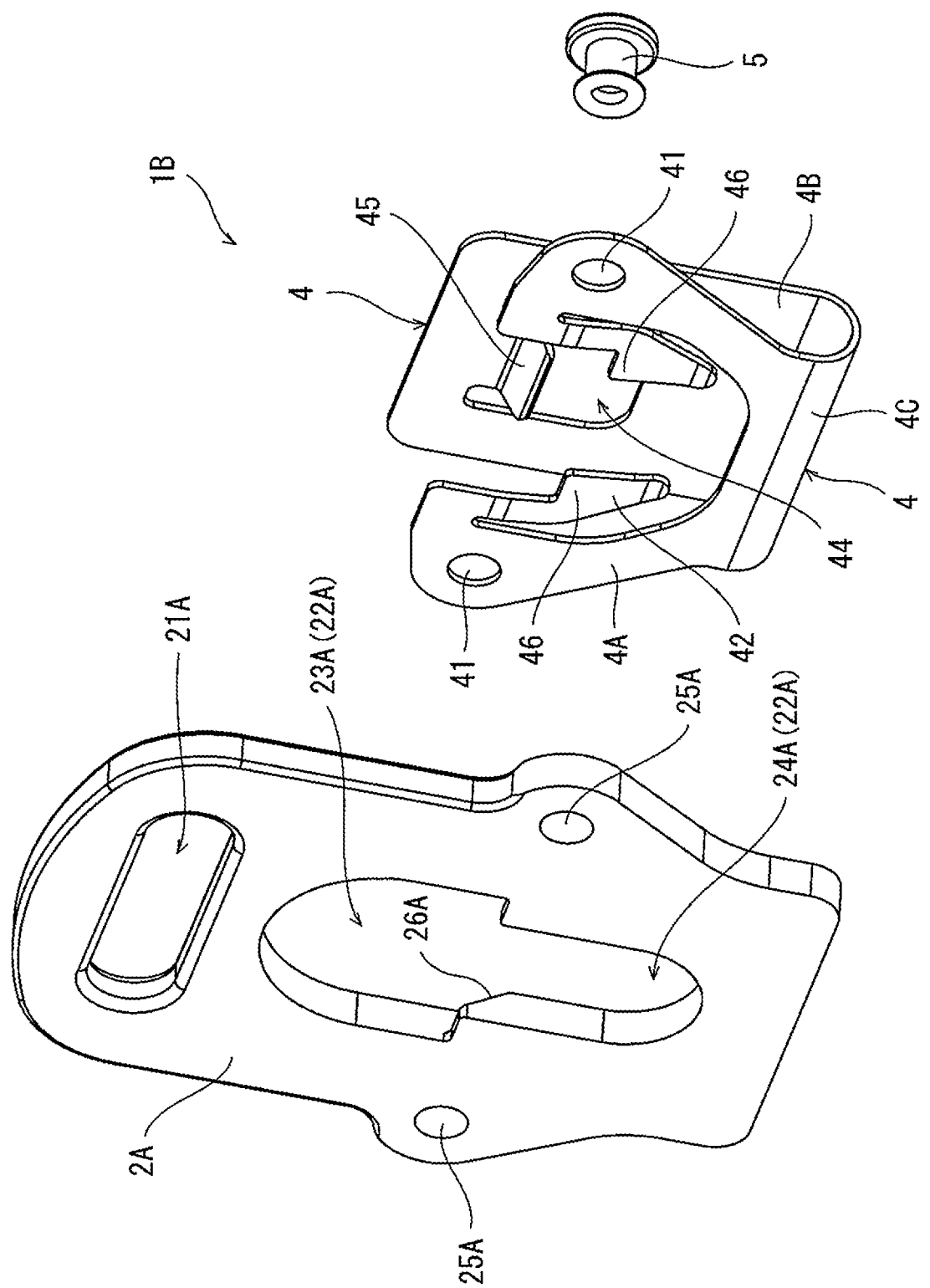
FIG. 17 is an exploded perspective view of the anchor device illustrated in FIG. 16 viewed from the back side.
Figure 18B:
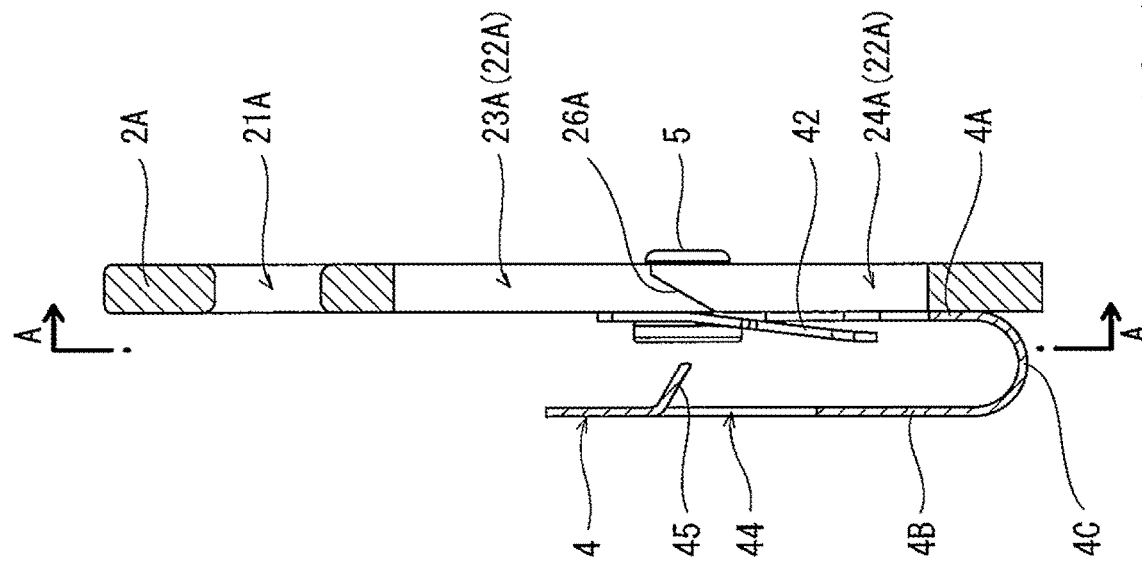
FIGS. 18A and 18B are a transverse sectional view and a longitudinal sectional view, respectively, of the anchor device illustrated in FIG. 9 (FIG. 18A is a cross-sectional view taken along line A-A in FIG. 18B)
Figure 18A:
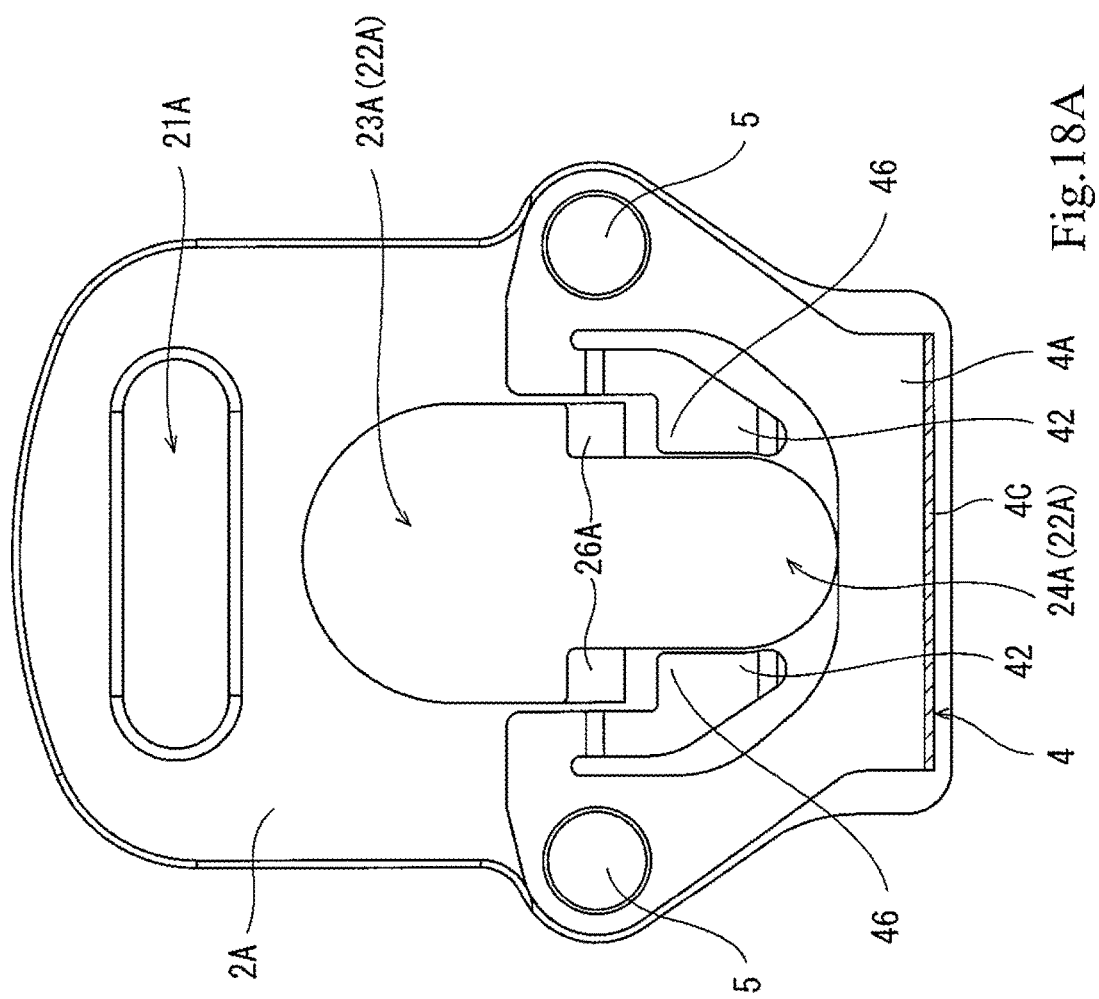

When the shank 62 of the stud 6 has entered the lock region 24A from the enlarged region 23A, the biasing pieces 42 is interposed between the head 61 of the stud 6 and the anchor plate 2 as illustrated in FIGS. 15A and 15B to bias the head 61 in a direction departing from the anchor plate 2A. Accordingly, the anchor plate 2A is pressed against a side of the vehicle body 7, thereby preventing relative vibration between the stud 6 and the anchor plate 2A.

Each guide piece 43 extends upward in parallel to the biasing piece 42 from a lower end portion of the corresponding biasing piece 42. The guide piece 43 guides the head 61 of the stud 6 when the shank 62 of the stud 6 enters the lock region 24A from the enlarged region 23A. More specifically, the guide piece 43 is positioned in the enlarged region 23A of the second opening 22A and tilted closer to the vehicle body 7 from the lock region 24A toward the enlarged region 23A. With such a configuration, when the shank 62 of the stud 6 enters the lock region 24A from the enlarged region 23A, the head 61 of the stud 6 inserted into the enlarged region 23A moves in the axial direction of the stud 6 along the guide piece 43 and is lifted up to above a surface of the anchor plate 2A as illustrated in FIGS. 14A and 14B.

Figure 13A:
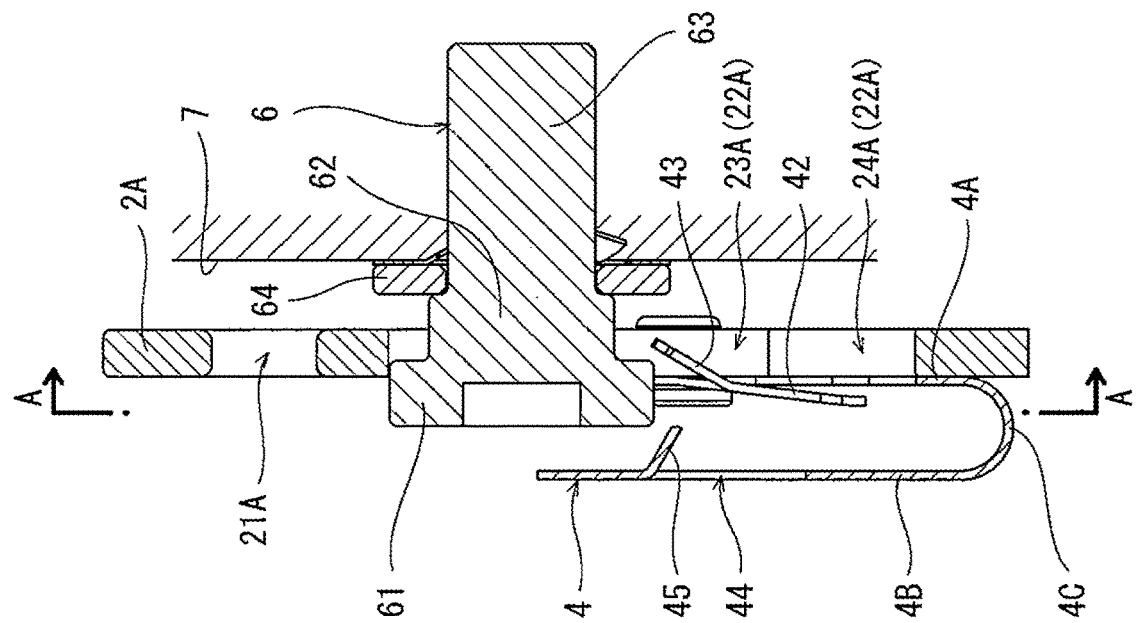
FIGS. 13A and 13B are a transverse sectional view and a longitudinal sectional view, respectively, of a state right before the anchor device illustrated in FIG. 1 is fixed to the stud (FIG. 13A is a cross-sectional view taken along line A-A in FIG. 13B)

The second plate portion 4B is provided with, substantially at a center, an opening 44 having a substantially rectangular shape. The second plate portion 4B is also provided with a lock piece 45 protruding downward toward the center of the opening 44. The lower portion of the lock piece 45 is bent toward the anchor plate 2A. When the anchor plate 2A is moved upward in a state (refer to FIGS. 13A and 13B) in which the head 61 of the stud 6 is inserted into the enlarged region 23A of the second opening 22A, the lock piece 45 elastically deforms to become separated from the anchor plate 2A, thereby allowing the head 61 to pass while contacting the head 61 (refer to FIGS. 14A and 14B). In addition, when the shank 62 of the stud 6 has entered the lock region 24A as illustrated in FIGS. 15A and 15B, the lock piece 45 prevents the stud 6 from returning to the enlarged region 23A.

When the anchor device 1A is to be removed from the stud 6, the upper end of the second plate portion 4B is operated in the state illustrated in FIGS. 15A and 15B to elastically deform the entire second plate portion 4B so that the lock piece 45 is separated from the anchor plate 2A. Accordingly, the stud 6 is allowed to return to the enlarged region 23A.

Each guide piece 43 described above is provided at a position facing the lock piece 45 in the thickness direction of the anchor plate 2A. The guide piece 43 guides the head 61 so that the head 61 of the stud 6 presses up the lock piece 45 in the direction departing from the anchor plate 2A when the shank 62 of the stud 6 enters the lock region 24A from the enlarged region 23A as illustrated in FIGS. 14A and 14B.

Figure 13B:
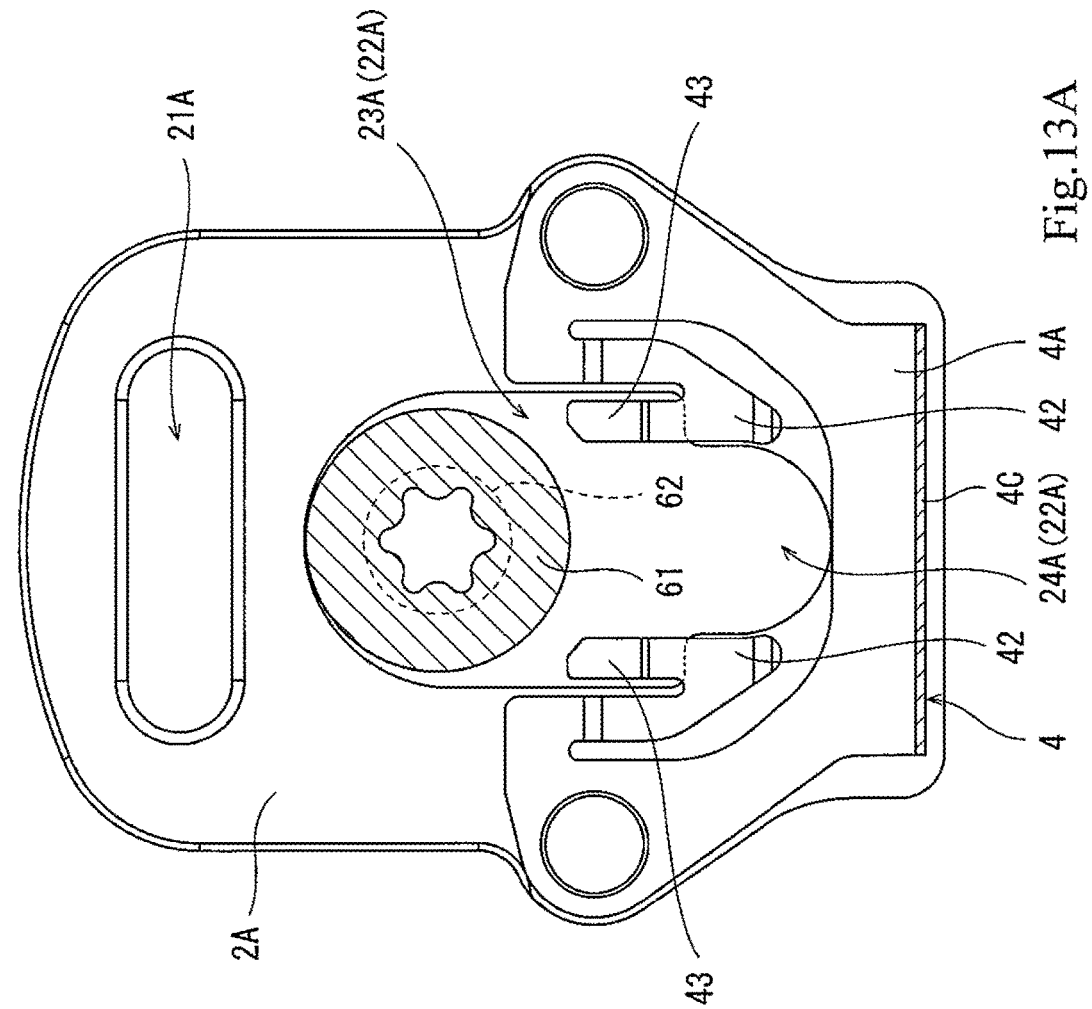

As described above, in the anchor device 1A according to the present embodiment, the stopper 4 includes the guide piece 43. Thus, when the anchor plate 2A is moved upward so that the shank 62 of the stud 6 enters the lock region 24A from the enlarged region 23A while the head 61 of the stud 6 is placed in the enlarged region 23A without passing through the enlarged region 23A of the second opening 22A as illustrated in FIG. 13B, the head 61 of the stud 6 is guided by the guide piece 43 and automatically moves in the axial direction of the stud 6. Thus, the anchor device 1A can be easily fixed to the stud 6.

When the anchor plate 2A is to be moved upward while the head 61 of the stud 6 is inserted into the enlarged region 23A, the lock piece 45 needs to be pressed up in the direction departing from the anchor plate 2A so that the head 61 of the stud 6 passes through the lock piece 45. In the present embodiment, since the head 61 of the stud 6 being guided by the guide piece 43 presses up the lock piece 45 in the direction departing from the anchor plate 2A, a worker does not need to apply large force on the anchor plate 2A in the thickness direction orthogonal to the moving direction. Thus, the anchor device 1A can be more easily fixed to the stud 6.

In addition, in the present embodiment, when the anchor device 1A is fixed to the stud 6, the anchor plate 2A is pressed against the vehicle body 7 by biasing force of the biasing pieces 42 of the stopper 4. Thus, the anchor plate 2A is prevented from vibrating relative to the stud 6 and generating abnormal noise. Moreover, since the biasing pieces 42 are interposed between the head 61 of the stud 6 and the anchor plate 2A, the head 61 of the stud 6 prevents, for example, a leg or baggage of a passenger of a vehicle from directly contacting the biasing pieces 42. In other words, the head 61 of the stud 6 protects the biasing pieces 42 of the stopper 4. This can improve the durability of the abnormal noise prevention function of the stopper 4.

Modification

The biasing pieces 42 and the guide pieces 43 of the stopper 4 do not necessarily need to be parallel. For example, as illustrated in FIG. 8, each biasing piece 42 may be coupled with the base portion of the first plate portion 4A and extend upward from a position contacting the anchor plate 2A while floating off the anchor plate 2A. In this case, the pair of guide pieces 43 may be disposed above the pair of biasing pieces 42, and each guide piece 43 may extend upward from the upper end portion of the corresponding biasing piece 42. With such a configuration, the biasing pieces 42 and the guide pieces 43 are continuous, and thus the shape of the stopper 4 can be simplified as compared to a case in which the biasing pieces 42 and the guide pieces 43 are parallel.

Figure 20:
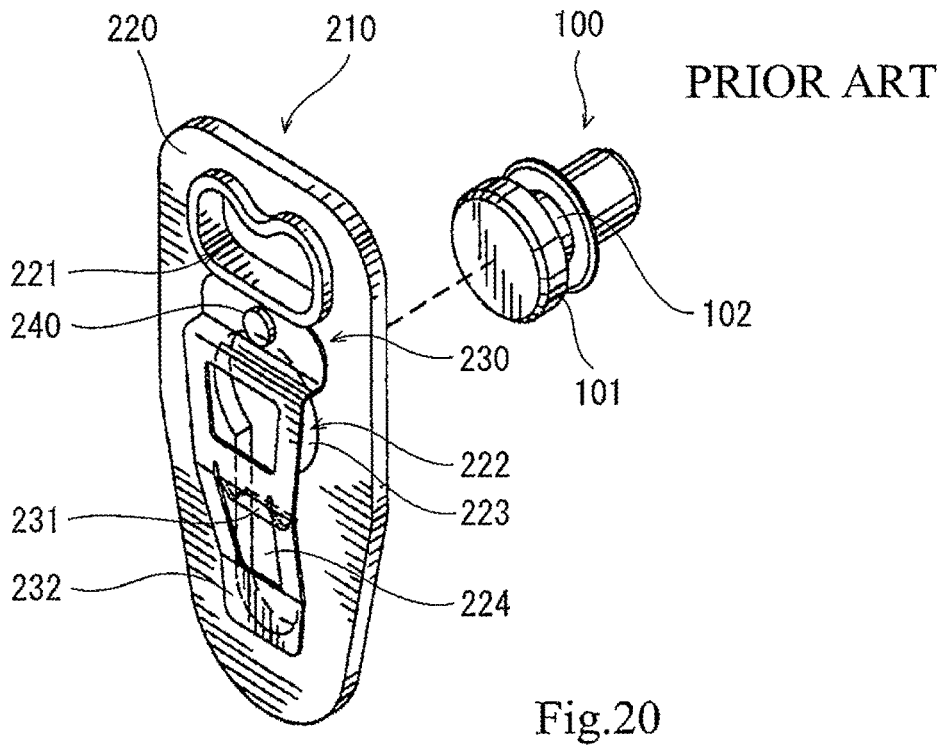
FIG. 20 is a perspective view of another conventional seat belt anchor device.
Figure 21:
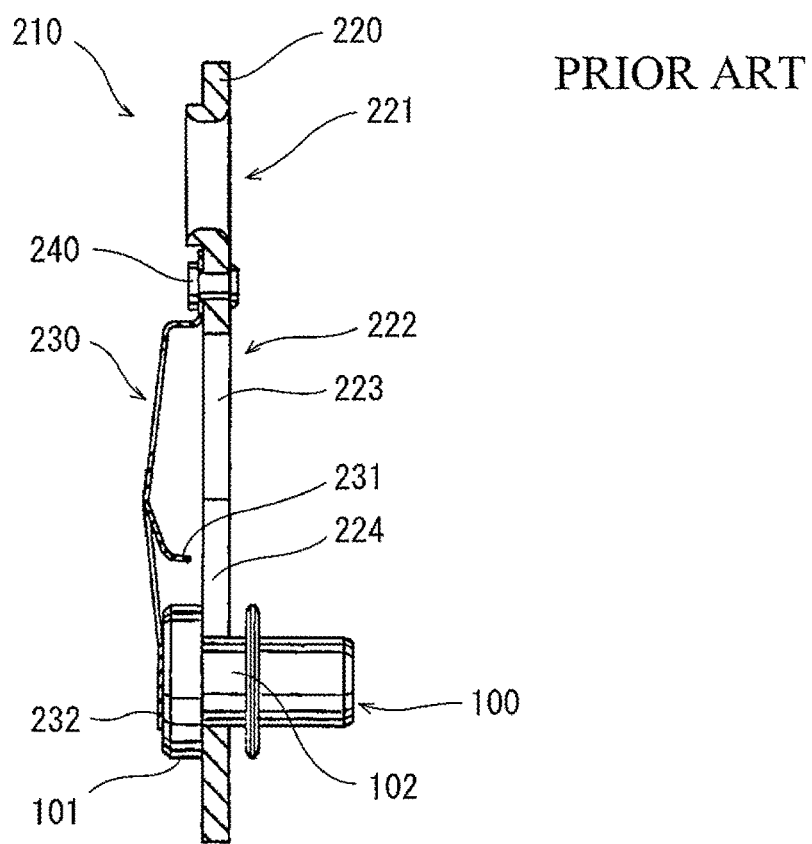
FIG. 21 is a cross-sectional view of a state in which the anchor device illustrated in FIG. 20 is fixed to the stud.

The spacer 64 may be omitted, and the anchor plate 2A may be pressed against the stepped portion between the head 61 of the stud 6 and the shank 62 so that the anchor plate 2A floats off the vehicle body 7. In other words, although not illustrated, similarly to a conventional stopper 230 illustrated in FIG. 20, the stopper 4 may include a pressing piece that presses the head 61 of the stud 6 to the anchor plate 2A. The present modification is also applicable to a third embodiment to be described later.

Third Embodiment

FIGS. 16 to 18B illustrate a seat belt anchor device 1B according to the third embodiment of the present invention. In the present embodiment, an identical reference sign denotes any component identical to that of the second embodiment, and duplicate description will be omitted.

In the present embodiment, the stopper 4 is not provided with the guide piece 43, but guide surfaces 26A are provided on both sides of the lock region 24A of the anchor plate 2A. Thus, the length of the enlarged region 23A and the length of the lock region 24A in the up-down direction are substantially equal to each other.

The guide surfaces 26A are provided by using a stepped portion between the enlarged region 23A and the lock region 24A. Each guide surface 26A is tilted closer to the vehicle body 7 from the lock region 24A toward the enlarged region 23A. The guide surfaces 26A guide the head 61 when the shank 62 of the stud 6 enters the lock region 24A from the enlarged region 23A of the second opening 22A.

In addition, in the present embodiment, each biasing piece 42 is provided with an extension portion 46 that extends to fill the gap between the corresponding guide surface 26A and the lower end portion of the biasing piece 42.

The present embodiment can achieve the same effects as those of the second embodiment.

Other Embodiments

The present invention is not limited to the above-described embodiments but may be modified in various kinds of manners without departing from the scope of the present invention.

For example, in the second embodiment and the third embodiment, the stopper 4 does not necessarily need to have a U shape including the first plate portion 4A, the second plate portion 4B, and the turned portion 4C. For example, although not illustrated, the second plate portion 4B and the turned portion 4C may be omitted but a floating portion that floats off the anchor plate 2 may be provided above the first plate portion 4A and provided with the lock piece 45.

From the above description, many modifications and other embodiments of the present invention will be apparent to those skilled in the art. Accordingly, the above description is to be construed as illustrative only, and is provided for the purpose of teaching those skilled in the art the best mode of carrying out the invention. It is possible to substantially change the details of its structure and/or function without departing from the spirit of the present invention.

What is claimed is:

1. A seat belt anchor device to be fixed to a stud provided to a vehicle body and including a shank and an enlarged head, the seat belt anchor device comprising:
   an anchor plate including an opening and a loop attached portion that fixes a loop formed at one end of a seat belt and is formed between one end of the anchor plate and the opening, the opening including an enlarged region and a lock region extending from the enlarged region in a direction opposite to the loop attached portion, the enlarged head being allowed to be inserted into the enlarged region and not being allowed to enter the lock region from the enlarged region, and the shank being allowed to enter the lock region from the enlarged region;
   a stopper attached to a first surface of the anchor plate, the first surface being located on a side opposite to the vehicle body, and the stopper being configured to engage with the enlarged head when the shank enters the lock region from the enlarged region; and
   a guide portion guiding the enlarged head in an insertion direction when the enlarged head is moved in a direction toward the lock region in a state where the enlarged head is located within a thickness of the anchor plate in the enlarged region, the insertion direction being a direction from a second surface of the anchor plate toward the first surface of the anchor plate, the second surface being located on a side of the vehicle body, wherein
   the guide portion is tilted so as to gradually approach the second surface of the anchor plate from the first surface of the anchor plate as the guide portion extends away from the lock region.

2. The seat belt anchor device according to claim 1, wherein
   the stopper includes a lock piece,
   the lock piece allowing the enlarged head to move on the first surface of the anchor plate from the enlarged region to the lock region when the shank enters the lock region from the enlarged region and preventing the enlarged head from moving from the lock region to the enlarged region,
   the guide portion disposed with a gap interposed between the lock piece and the guide portion in a thickness direction of the anchor plate, and
   the guide portion guiding the enlarged head so that the enlarged head presses up the lock piece in a direction departing from the first surface when the enlarged head is moved in a direction toward the lock region in a state where the enlarged head is located within the thickness of the anchor plate in the enlarged region.

3. The seat belt anchor device according to claim 1, wherein
   the guide portion is provided on a separate member attached to the anchor plate.

4. The seat belt anchor device according to claim 3, wherein
the separate member is the stopper attached to the anchor plate.

5. The seat belt anchor device according to claim 1, wherein
the stopper includes a guide piece as the guide portion, and
the guide piece is located in the enlarged region of the opening.

6. The seat belt anchor device according to claim 5, wherein
the stopper includes a biasing piece that is interposed between the enlarged head and the first surface of the anchor plate to bias the enlarged head in a direction departing from the first surface of the anchor plate when the shank enters the lock region from the enlarged region.

7. The seat belt anchor device according to claim 6, wherein
when a first direction is defined to be a direction from the enlarged region toward the lock region, and a second direction is defined to be a direction from the lock region toward the enlarged region,
the biasing piece extends from a position contacting the first surface of the anchor plate in the first direction while floating off the first surface of the anchor plate, and
the guide piece extends in the second direction in parallel to the biasing piece from an end portion of the biasing piece in the first direction.

8. The seat belt anchor device according to claim 6, wherein
when a first direction is defined to be a direction from the enlarged region toward the lock region, and a second direction is defined to be a direction from the lock region toward the enlarged region,
the biasing piece extends from a position contacting the first surface of the anchor plate in the second direction while floating off the first surface of the anchor plate, and
the guide piece extends in the second direction from an end portion of the biasing piece in the second direction.

9. The seat belt anchor device according to claim 6, wherein
the stopper includes a lock piece,
the lock piece allowing the enlarged head to move on the first surface of the anchor plate from the enlarged region to the lock region when the shank enters the lock region from the enlarged region and preventing the enlarged head from moving from the lock region to the enlarged region, and
the stopper includes
a first plate portion that contacts the first surface of the anchor plate,
a second plate portion disposed over the opening with a gap interposed between the first surface and the second plate portion, and
a connection portion that couples the first plate portion and the second plate portion,
the lock piece is provided to the second plate portion, and
the biasing piece and the guide piece are provided to the first plate portion.

10. A seat belt anchor device to be fixed to a stud provided to a vehicle body and including a shank and an enlarged head, the seat belt anchor device comprising:
an anchor plate including an opening and a loop attached portion that fixes a loop formed at one end of a seat belt and is formed between one end of the anchor plate and the opening, the opening including an enlarged region and a lock region extending from the enlarged region in a direction opposite to the loop attached portion, the enlarged head being allowed to be inserted into the enlarged region and not being allowed to enter the lock region from the enlarged region, and the shank being allowed to enter the lock region from the enlarged region; and
a stopper attached to a first surface of the anchor plate, the first surface being located on a side opposite to the vehicle body, and the stopper being configured to engage with the enlarged head when the shank enters the lock region from the enlarged region, wherein
the stopper includes a biasing piece that is interposed between the enlarged head and the first surface of the anchor plate to bias the enlarged head in a direction departing from the first surface of the anchor plate when the shank enters the lock region from the enlarged region.

11. The seat belt anchor device according to claim 10, wherein
the stopper includes a lock piece,
the lock piece allowing the enlarged head to move on the first surface of the anchor plate from the enlarged region to the lock region when the shank enters the lock region from the enlarged region and preventing the enlarged head from moving from the lock region to the enlarged region,
the stopper includes
a first plate portion that contacts the first surface of the anchor plate,
a second plate portion disposed over the opening with a gap interposed between the first surface and the second plate portion, and
a connection portion that couples the first plate portion and the second plate portion,
the lock piece is provided to the second plate portion, and
the biasing piece is provided to the first plate portion.

12. The seat belt anchor device according to claim 11, wherein
the first plate portion includes a portion that comes into contact with the first surface of the anchor plate around the biasing piece and is connected to the connection portion.

13. A seat belt anchor device to be fixed to a stud provided to a vehicle body and including a shank and an enlarged head, the seat belt anchor device comprising:
an anchor plate including an opening and a loop attached portion that fixes a loop formed at one end of a seat belt and is formed between one end of the anchor plate and the opening, the opening including an enlarged region and a lock region extending from the enlarged region in a direction opposite to the loop attached portion, the enlarged head being allowed to be inserted into the enlarged region and not being allowed to enter the lock region from the enlarged region, and the shank being allowed to enter the lock region from the enlarged region; and
a stopper attached to a first surface of the anchor plate, the first surface being located on a side opposite to the vehicle body, and the stopper being configured to engage with the enlarged head when the shank enters the lock region from the enlarged region, wherein
the stopper includes a lock piece, the lock piece allowing the enlarged head to move on the first surface of the anchor plate from the enlarged region to the lock region when the shank enters the lock region from the enlarged region and preventing the enlarged head from moving from the lock region to the enlarged region, the stopper includes
- a first plate portion that contacts the first surface of the anchor plate,
- a second plate portion disposed over the opening with a gap interposed between the first surface and the second plate portion, and
- a connection portion that couples the first plate portion and the second plate portion, and the lock piece is provided to the second plate portion.

14. The seat belt anchor device according to claim 13, wherein
the connection portion is a turned portion.

15. The seat belt anchor device according to claim 13, wherein
the stopper is attached to the first surface of the anchor plate by an attachment member on a side of the opening.

16. A seat belt anchor device to be fixed to a stud provided to a vehicle body and including a shank and an enlarged head, the seat belt anchor device comprising:
- an anchor plate including an opening and a loop attached portion that fixes a loop formed at one end of a seat belt and is formed between one end of the anchor plate and the opening, the opening including an enlarged region and a lock region extending from the enlarged region in a direction opposite to the loop attached portion, the enlarged head being allowed to be inserted into the enlarged region and not being allowed to enter the lock region from the enlarged region, and the shank being allowed to enter the lock region from the enlarged region;
- a stopper attached to a first surface of the anchor plate, the first surface being located on a side opposite to the vehicle body, and the stopper being configured to engage with the enlarged head when the shank enters the lock region from the enlarged region; and
- a protector attached to the first surface, the protector including a portion covering a part of the stopper and a cover portion covering at least an edge of the loop attached portion on a side of the opening, wherein
- a part of the cover portion is provided between an inner side of the loop and the edge of the loop attached portion.

17. The seat belt anchor device according to claim 16, wherein the cover portion extends to a second surface of the anchor plate, the second surface being located on the vehicle body side.

18. The seat belt anchor device according to claim 16, wherein
the stopper includes:
- a first plate portion that contacts the first surface of the anchor plate,
- a second plate portion disposed over the opening with a gap interposed between the first surface and the second plate portion, and
- a connection portion that couples the first plate portion and the second plate portion, and the protector includes a portion located on the first surface side relative to the second plate.

19. A seat belt anchor device to be fixed to a stud provided to a vehicle body and including a shank and an enlarged head, the seat belt anchor device comprising:
- an anchor plate including an opening and a loop attached portion that fixes a loop formed at one end of a seat belt and is formed between one end of the anchor plate and the opening, the opening including an enlarged region and a lock region extending from the enlarged region in a direction opposite to the loop attached portion, the enlarged head being allowed to be inserted into the enlarged region and not being allowed to enter the lock region from the enlarged region, and the shank being allowed to enter the lock region from the enlarged region;
- a stopper attached to a first surface of the anchor plate, the first surface being located on a side opposite to the vehicle body, and the stopper being configured to engage with the enlarged head when the shank enters the lock region from the enlarged region; and
- a protector attached to the first surface, the protector including a portion covering a part of the stopper and a cover portion covering at least an edge of the loop attached portion on a side of the opening, wherein
the stopper includes a first plate portion that contacts the first surface of the anchor plate, a second plate portion disposed over the opening with a gap interposed between the first surface and the second plate portion, and a connection portion that couples the first plate portion and the second plate portion, and
the protector includes a portion located on the first surface side relative to the second plate.

* * * * *